(12) United States Patent
Rho et al.

(10) Patent No.: US 10,197,891 B2
(45) Date of Patent: Feb. 5, 2019

(54) PORTABLE ELECTRONIC DEVICE AND ELECTRONIC DEVICE

(71) Applicant: Samsung Electronics Co., Ltd., Gyeonggi-do (KR)

(72) Inventors: Hyung Jin Rho, Gyeonggi-do (KR); Byung Kwon Kang, Gyeonggi-do (KR); Young Bok Yu, Gyeonggi-do (KR); Sung Wook Choi, Gyeonggi-do (KR); Dong Hun Yu, Seoul (KR); Ki Huk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/670,125

(22) Filed: Aug. 7, 2017

(65) Prior Publication Data
US 2018/0059512 A1    Mar. 1, 2018

(30) Foreign Application Priority Data

Aug. 24, 2016  (KR) .......................... 10-2016-0107725

(51) Int. Cl.
*G03B 17/14*   (2006.01)
*G03B 17/06*   (2006.01)
(Continued)

(52) U.S. Cl.
CPC .............. *G03B 17/14* (2013.01); *G02B 7/08* (2013.01); *G03B 17/06* (2013.01); *G02B 7/02* (2013.01); *G03B 3/02* (2013.01); *G03B 17/56* (2013.01)

(58) Field of Classification Search
CPC ...................................................... G03B 17/14
(Continued)

(56) References Cited

U.S. PATENT DOCUMENTS 7,535,662 B2   5/2009  Hong et al.
7,570,880 B2   8/2009  Yoon et al.
(Continued)

FOREIGN PATENT DOCUMENTS

KR   20080010966 A    1/2008
KR     200455061 Y1   8/2011
(Continued)

OTHER PUBLICATIONS

International Search Report dated Nov. 17, 2017.
European Search Report dated Jan. 24, 2018.
European Search Report dated May 3, 2018.

*Primary Examiner* — Clayton E LaBalle
*Assistant Examiner* — Kevin Butler
(74) *Attorney, Agent, or Firm* — Cha & Reiter, LLC

(57) ABSTRACT

An electronic device is provided. The electronic device includes an image sensor for capturing an image; a barrel including a lens group arranged about a first axis perpendicular to the image sensor, a first housing fixed to the barrel; a second housing disposed under the first housing and coupled to the first housing; at least one magnetic substance disposed at one side of the first housing; and at least one coil disposed at one side of the second housing. When power is supplied to the at least one coil, electromagnetic force is generated between the at least one coil and the at least one magnetic substance. And if the electromagnetic force is generated, the first housing rotates clockwise or counterclockwise, and the barrel moves along the first axis.

18 Claims, 24 Drawing Sheets

(51) Int. Cl.
  *G02B 7/08* (2006.01)
  *G03B 3/02* (2006.01)
  *G03B 17/56* (2006.01)
  *G02B 7/02* (2006.01)

(58) Field of Classification Search
  USPC .......................................................... 396/530
  See application file for complete search history.

(56) References Cited

U.S. PATENT DOCUMENTS

| | | | |
|---|---|---|---|
| 8,014,091 B2 | 9/2011 | Kang et al. | |
| 9,075,199 B2 | 7/2015 | Jiao et al. | |
| 9,690,024 B2 * | 6/2017 | Jiao | ...................... G02B 5/3041 |
| 9,794,441 B2 | 10/2017 | Eom et al. | |
| 2006/0257131 A1 * | 11/2006 | Yoon | ........................ G02B 7/08 |
| | | | 396/133 |
| 2008/0144197 A1 * | 6/2008 | Hong | ....................... G02B 7/08 |
| | | | 359/824 |
| 2008/0285163 A1 * | 11/2008 | Kasuga | ................... G02B 7/021 |
| | | | 359/823 |
| 2010/0053784 A1 * | 3/2010 | Kang | ...................... G02B 7/102 |
| | | | 359/824 |
| 2014/0118826 A1 * | 5/2014 | Jiao | .......................... G02B 5/30 |
| | | | 359/491.01 |
| 2015/0358498 A1 | 12/2015 | Eom et al. | |
| 2015/0378078 A1 | 12/2015 | Jiao et al. | |

FOREIGN PATENT DOCUMENTS

| | | | | |
|---|---|---|---|---|
| KR | 101079026 B1 | 11/2011 | | |
| KR | 10-2013-0027335 A | 3/2013 | | |
| KR | 20130027335 | * 3/2013 | ........... | G02F 1/1333 |
| KR | 10-2014-0144126 A | 12/2014 | | |
| KR | 10-2015-0091860 A | 8/2015 | | |
| KR | 20150091860 | * 8/2015 | ............... | G02B 7/04 |

* cited by examiner

PORTABLE ELECTRONIC DEVICE AND ELECTRONIC DEVICE

CLAIM OF PRIORITY

This application claims the benefit under 35 U.S.C. § 119(a) of a Korean patent application filed on Aug. 24, 2016 in the Korean Intellectual Property Office and assigned Serial number 10-2016-0107725, the entire disclosure of which is hereby incorporated by reference.

TECHNICAL FIELD

Embodiments disclosed in the present disclosure relate to camera devices capable of providing auto-focusing functions and electronic devices using the same.

BACKGROUND

Camera devices generally include lens driving units. These camera devices may perform focusing by virtue of the lens driving unit—the lens driving unit moves the lenses of the camera devices in relation to the image sensors of the camera devices, so that the light refracted by the lenses can properly focus on the image sensors.

For example, a type of lens driving unit may include a magnet, which generates magnetic force, and a coil to which a current is applied. The lens driving unit may move a barrel of the lens by using electromagnetic force between the magnet and the coil. Alternatively, another type of lens driving unit may include an open loop actuator when the lens driving unit is a voice coil spring type driving unit. In still another type of lens driving unit, it may include a closed loop actuator when the lens driving unit is a hall sensing type driving unit.

In the camera device, the barrel of the lens may move up and down along an optical axis. A top cover part (which may be made by insert-mold or be pressed) is formed having a height equal to or higher than that of the maximum protrusion surface of the lens driving unit.

SUMMARY

Aspects of the present disclosure are to address at least the above-mentioned problems and/or disadvantages and to provide at least the advantages described below. Various embodiments disclosed in the present disclosure may provide an electronic device capable of moving a barrel as the barrel is rotated.

In accordance with an aspect of the present invention, an electronic device includes an image sensor that captures an image, a barrel including a lens group arranged about a first axis perpendicular to the image sensor, a first housing fixed to the barrel, a second housing disposed under the first housing and coupled to the first housing, at least one magnetic substance disposed at one side of the first housing, and at least one coil disposed at one side of the second housing. When power is supplied to the at least one coil, electromagnetic force is generated between the at least one coil and the at least one magnetic. If the electromagnetic force is generated, the first housing rotates clockwise or counterclockwise, and the barrel moves along the first axis.

In accordance with another aspect of the present invention, a portable electronic device includes a housing including a first surface facing a first direction and a second surface facing a second direction that is opposite to the first direction, a camera device disposed in a portion of the first surface to face the first direction, and a processor electrically connected with the camera device. The camera device includes a plurality of lenses arranged along a first axis extending in the first direction, a barrel encapsulating the plurality of lenses, an image sensor interposed between the plurality of lenses and the second surface, and an actuator configured to change a distance between the lenses and the image sensor as the barrel moves along the first axis.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to the description of drawings, similar elements may be marked by similar reference numerals.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

Figure 1:
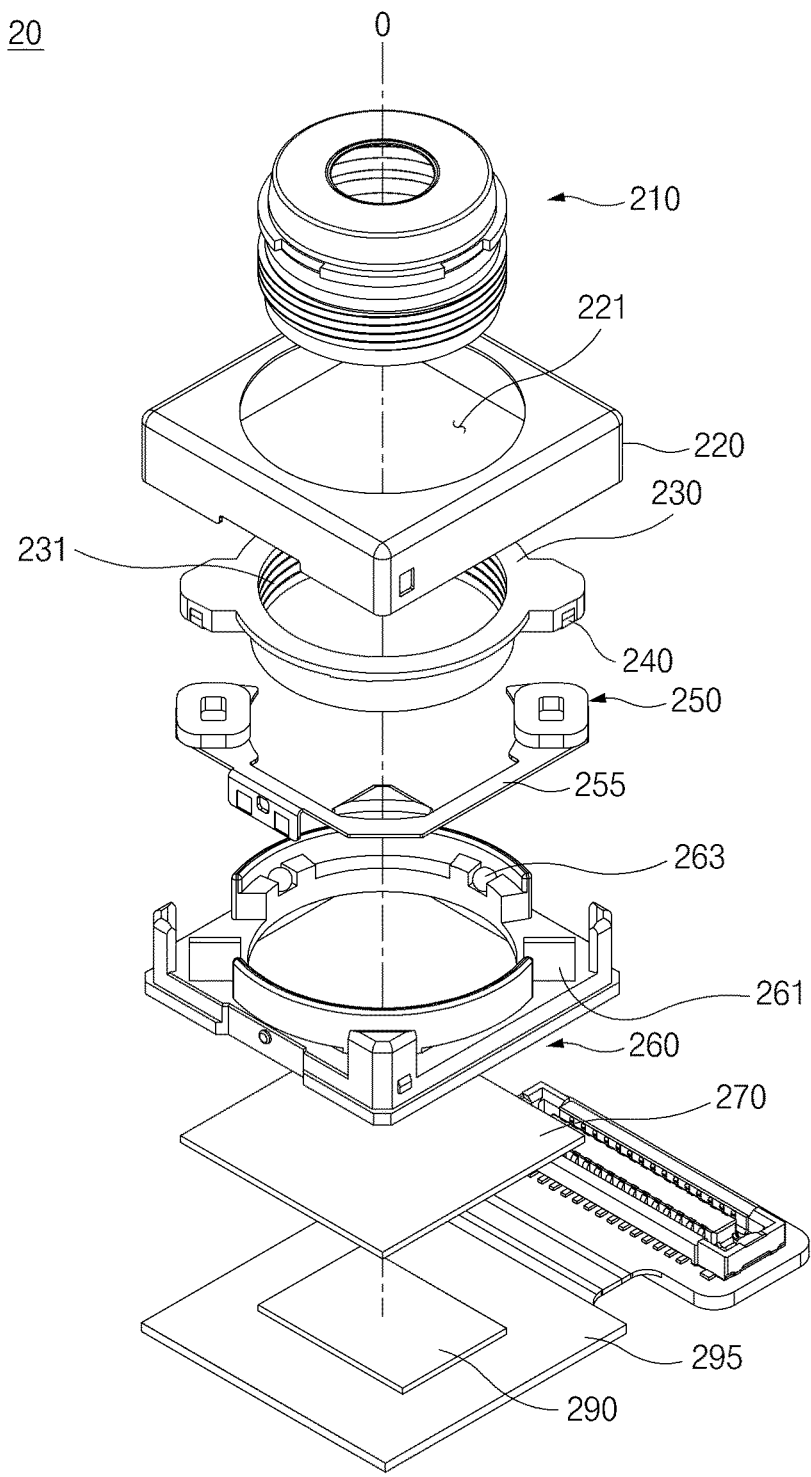
FIG. 1 is an exploded perspective view of a camera device, according to an embodiment of the present disclosure.

FIG. 1 is an exploded perspective view of a camera device, according to an embodiment.

As illustrated in FIG. 1, according to an embodiment, a camera device 20 may include an image sensor 290, a filter 270, a first housing 260, a plurality of yokes 261, a plurality of coils 250, a plurality of magnets 240, a second housing 230, a third housing 220, and a barrel 210. According to an embodiment, the camera device 20 may be included in another electronic device (e.g., an electronic device 901 of FIG. 9). In the present disclosure, an optical axis "O" may be a vertical central axis of a lens group included in the barrel 210. According to one or more embodiments, some elements may be excluded from the above elements or additional elements may be provided, without departing from the scope and spirit of the present disclosure. According to one or more embodiments, some of the elements may be combined with each other so as to form a single integrated element and the functions of the elements may be performed in the same manner as before the combination.

Figure 8:
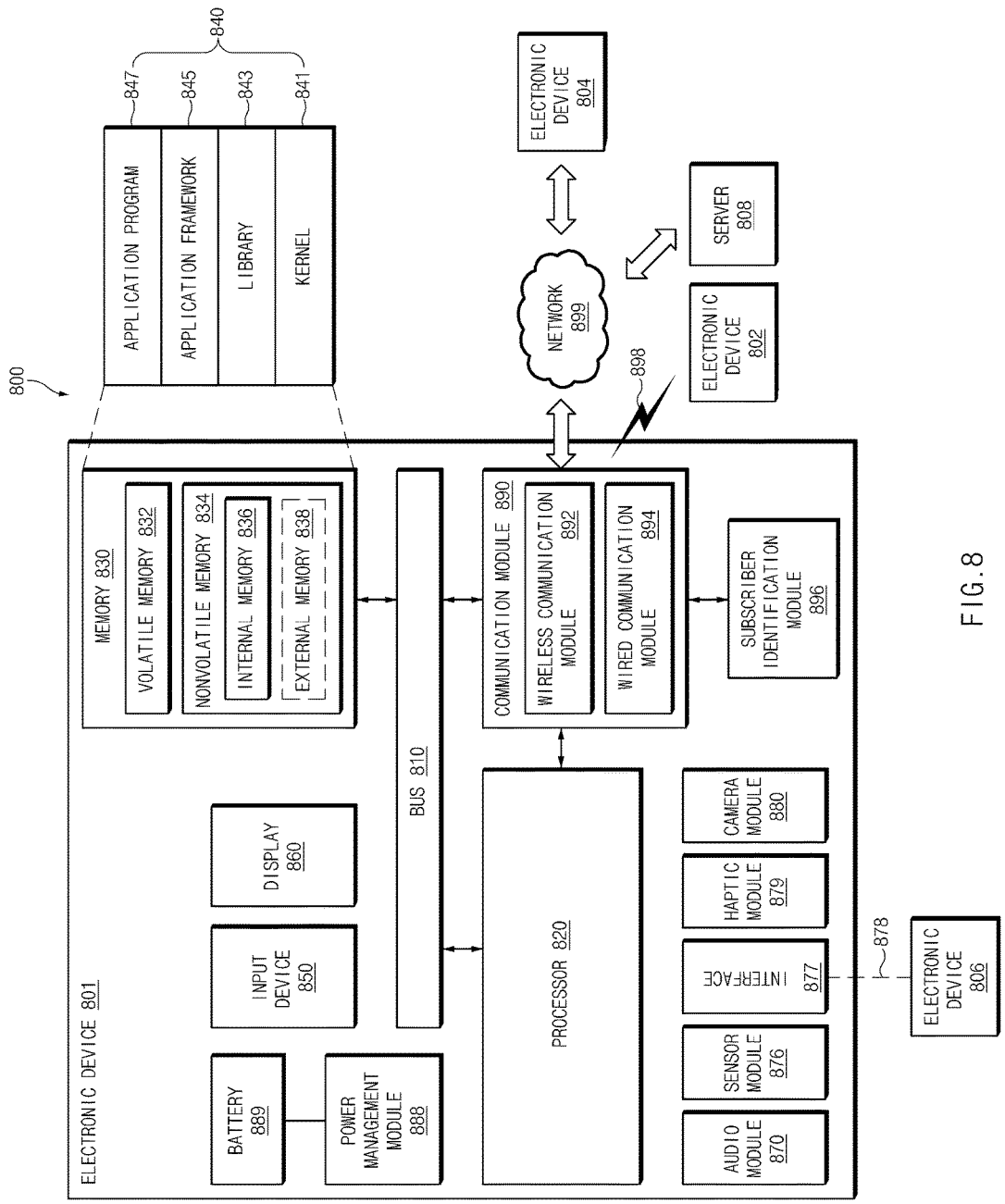
FIG. 8 is a block diagram of an electronic device in a network environment according to one embodiment.
Figure 9:
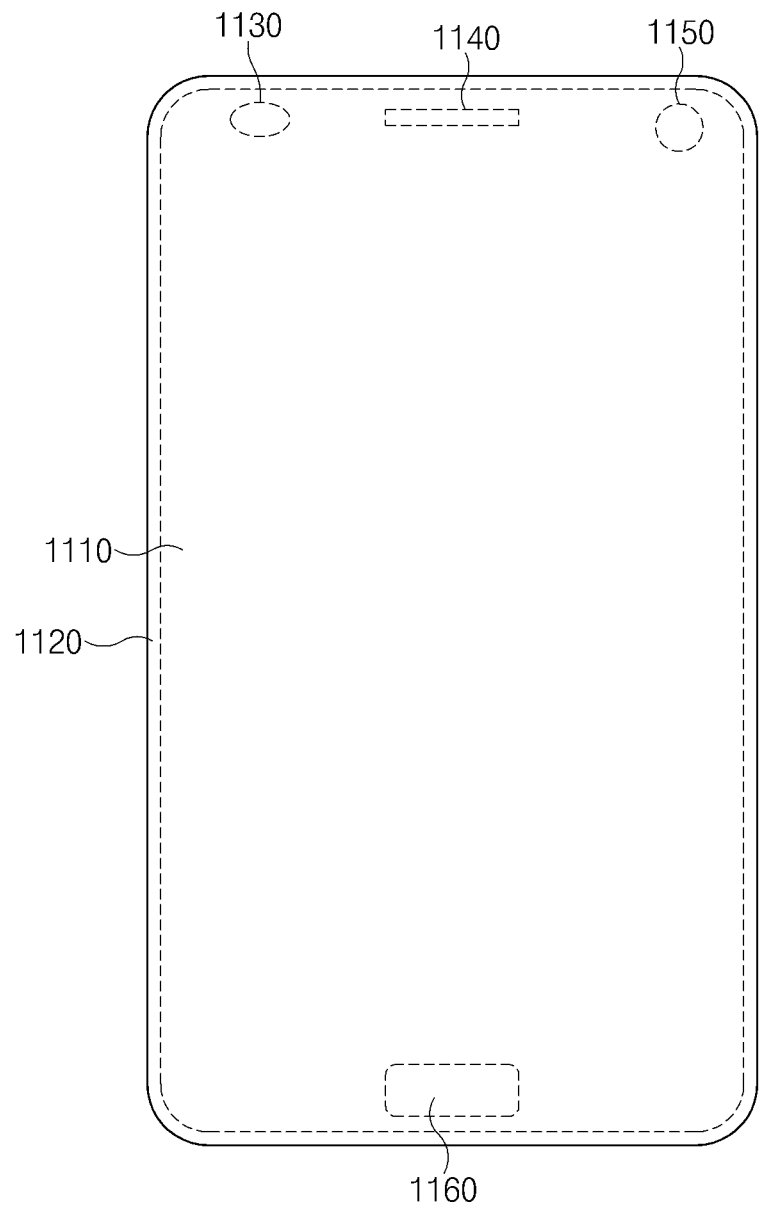
FIG. 9 is a view illustrating a front surface of the electronic device, according to one embodiment.

According to an embodiment, the camera device 20 may be, for example, a camera installed in one area of the front surface or the rear surface of the other electronic device (e.g., an electronic device 901 of FIG. 9). When mounted in the other electronic device, the image sensor 290 may be mounted on a first substrate 295. For example, the first substrate 295 may be coupled to a substrate (e.g., a main board) of the other electronic device via a connector. The substrate (e.g. the main board) of the other electronic device may have a memory (memory 830 of FIG. 8) and a processor (processor 820 of FIG. 8) mounted thereon and be connected to a display (display 860 of FIG. 8). For example, the processor may output an image, which is captured by the image sensor 290, onto the display.

According to an embodiment, the filter 270 may include an optical filter that is disposed above the image sensor 290. For example, the filter 270 may be filters such as neutral density (ND) filters or polarizing light (PL) color filters, so that the filter 270 may produce various effects for the captured image.

According to an embodiment, the first housing 260 is coupled to the third housing 220 such that the coils 250, the magnets 240, and the second housing 230 are housed within the assembly of the first housing 260 and the third housing 220 and are protected by the first housing 260 and the third housing 220. For example, the first housing 260 may be in a shape (rectangular shape) corresponding to the shape of the third housing 220 so that the two may be coupled. The first and third housings 260 and 220 may be disposed above the filter 270 and the image sensor 290 and be fixed to at least one of the filter 270 and the image sensor 290.

According to an embodiment, the second housing 230 may fix the barrel 210. The second housing 230 may also fix the magnets 240.

According to an embodiment, the yokes 261 may be provided on an inner surface of the first housing 260. According to an embodiment, the yokes 261 may be magnetic, so that the yokes 261 provide attractive forces to the magnets 240. For example, the yokes 261 may be located below the coils 250. Each yoke 261 may be rectangular or be another shape.

According to an embodiment, the coils 250 may be wound in a circular shape or an oval shape. The resultant electromagnetic force acting between the coils 250 and the magnets 240 may rotate the second housing 230. According to an embodiment, the coils 250 may be fixed to a second substrate 255 via a fixing member (e.g., an adhesive). Both ends of each coil 250 may be electrically connected (e.g., soldered) to the second substrate 255. The second substrate 255 may be, for example, a flexible printed circuit board (FPCB). The coils 250 may be, for example, disposed in parallel to the magnets 240. According to an embodiment, the coils 250 are spaced apart from the magnets 240 and stably apply force to the barrel 210. The coils 250 may be positioned symmetrically with respect to the optical axis.

According to an embodiment, when a current is applied to the coils 250, electromagnetic force may result between the magnets 240 and the coils 250. The second housing 230 may rotate clockwise or counterclockwise, driven by the electromagnetic force between the magnets 240 and the coils 250. In turn, the barrel 210 seated in the second housing 230 may also rotate clockwise or counterclockwise, driven by the electromagnetic force between the magnets 240 and the coils 250.

According to an embodiment, a plurality of ball bearings 263 may be interposed between the second housing 230 and the first housing 260. When the second housing 230 rotates by the electromagnetic force, the ball bearings 263 may facilitate the movement of the second housing 230. At least two ball bearings 263 may be included to stably support the second housing 230.

According to an embodiment, the third housing 220 is located above the first housing 260 and coupled to the first housing 260 such that the second housing 230 and other elements are housed within the assembly of the third housing 220 and the first housing 260, such that the second housing 230 and other elements are protected from foreign matters.

In addition, a third opening 221 may be provided in the central portion of the third housing 220 to expose the barrel 210. In this case, the third opening 221 may have a size so that it does not disrupt the rotation of the second housing 230.

According to an embodiment, the barrel 210 may be fitted into the third opening 221 and may be coupled to the third housing 220 and the second housing 230. The barrel 210 may be coupled to the second housing 230 through spiral threads (e.g., reference numerals 211 and 231).

Figure 2A:
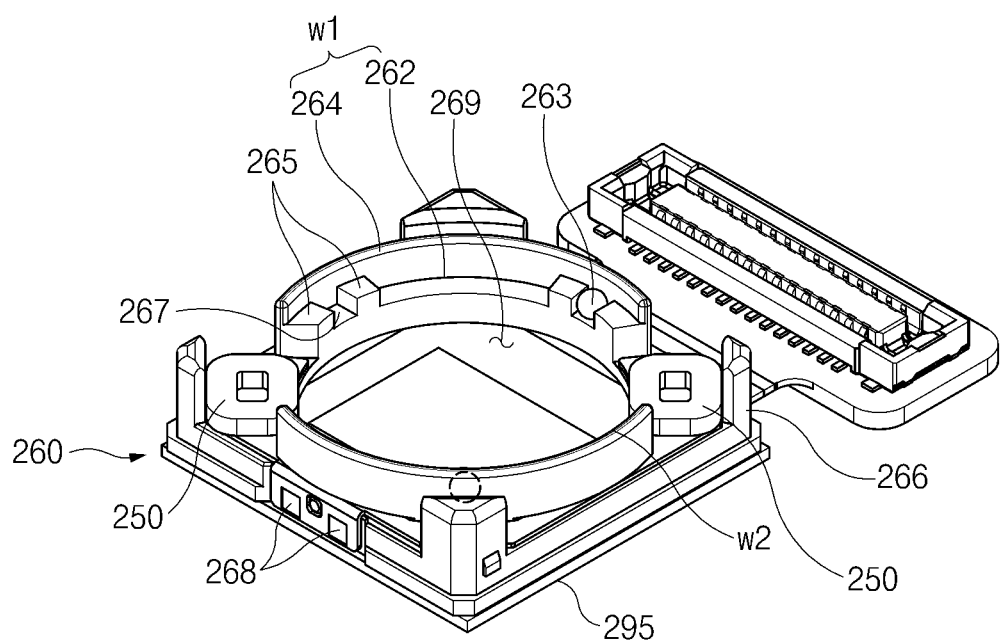
FIG. 2A is a perspective view of a first housing, according to an embodiment of the present disclosure.

FIG. 2A is a perspective view of the first housing, according to one embodiment.

As illustrated in FIG. 2A, according to an embodiment, the first housing 260 may be connected (or coupled) to the upper surface of the first substrate 295. The image sensor 290 and the filter 270 may be interposed between the first housing 260 and the first substrate 295. The filter 270 may be disposed on the bottom surface of the first housing 260, as shown, or be disposed on the top surface of the first housing 260. The coils 250, the second substrate 255, and the ball bearings 263 may be disposed in the inner surface of the first housing 260, as shown in FIG. 2A.

According to an embodiment, the first housing 260 may be rectangular, so that it may be coupled to the third housing 220. A plurality of protrusions 266 may form an outer frame of the first housing 260, which are then coupled to the third housing 220. For example, the protrusions 266 may be provided at four corners of the first housing 260, when the first housing 260 is rectangular.

According to an embodiment, a first opening 269 may be formed in the central portion of the first housing 260. The barrel 210 and the second housing 230 may be seated in the first opening 269. The first opening 269 may provide a transmission path for the light that passes through the lens group included in the barrel 210 to the image sensor 290.

According to an embodiment, the second substrate 255, the coils 250, and the ball bearings 263 may be seated between the outer frame of the first housing 260 and the first opening 269.

For example, curved walls w1 and w2 may be interposed between the outer frame of the first housing 260 and the first opening 269. The curved walls w1 and w2 may include a first curved wall w1 and a second curved wall w2. The first curved wall w1 and the second wall w2 may be disposed symmetrically about the first opening 269 when viewed from the top of the first housing 260. In one embodiment, the coils 250 may be provided at gaps between the first and second curved walls w1 and w2.

According to an embodiment, one or more of the curved walls (e.g., w1) may be a dual-wall including outer walls 264 having a first height and an inner wall 262 having a second height in between the outer walls 264 and the first opening 269. The inner wall 262 may be formed along the circumference of the first opening 269. The outer walls 264 may form an outer circumference for the second housing 230 when the second housing 230 is seated in (e.g., coupled to) the first opening 269, so as to provide proper alignment for the second housing 230 (e.g. the second housing is prevented from moving in directions perpendicular to the optical axis). A plurality of rolling grooves 267 may be formed on top of the inner walls 262. The rolling grooves 267 are further defined by the outer walls 264 because the height of the inner walls 262 is lower than that of the outer walls 264. The ball bearings 263 are seated in the rolling grooves 267.

According to an embodiment, each rolling groove 267 may include two protrusion parts 265 and the two protrusion parts 265 may be disposed on top of the inner walls 262. Accordingly, if three rolling grooves 267 are provided, six protrusion parts 265 may be disposed on top of the inner walls 262. The distance between the two protrusion parts 265 may be smaller at the end closest to the first opening 269 as compared with the distance at the end closest to the outer walls 264. Accordingly, the rolling grooves 267 may keep the ball bearings 263 in place between the protrusion parts 265 and on the rolling grooves 267. The rolling grooves 267 may have flat bottom surfaces or may have concave bottom surfaces such that the ball bearings 263 are seated on the rolling grooves 267. The rolling groves 267 may be equidistant from each other and be equidistant from the center of the first opening 269. For example, the rolling grooves 267 may be arranged at an interval of 120° or 180° therebetween along the inner wall 262. Therefore, according to one embodiment, when the second housing 230 rotates, the ball bearings 263 may stably and rotatably support the bottom surface of the second housing 230.

According to an embodiment, when the second housing 230 rotates as driven by the electromagnetic force generated between the magnets 240 and the coils 250, each ball bearing 263 may roll in rolling grooves 267 formed between the two protrusion parts 265. Accordingly, each ball bearing 263 may apply a rolling friction force to the bottom surface of the second housing 230. In this case, at least two ball bearings 263 may be included to stably and rotatably support the second housing 230.

Figure 2B:
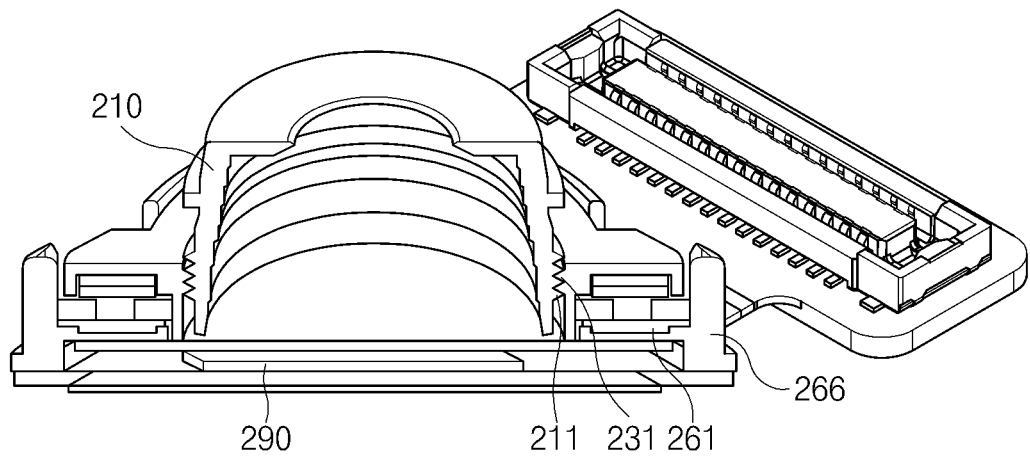
FIG. 2B is a sectional view of the camera device, according to an embodiment of the present disclosure.
Figure 2C:
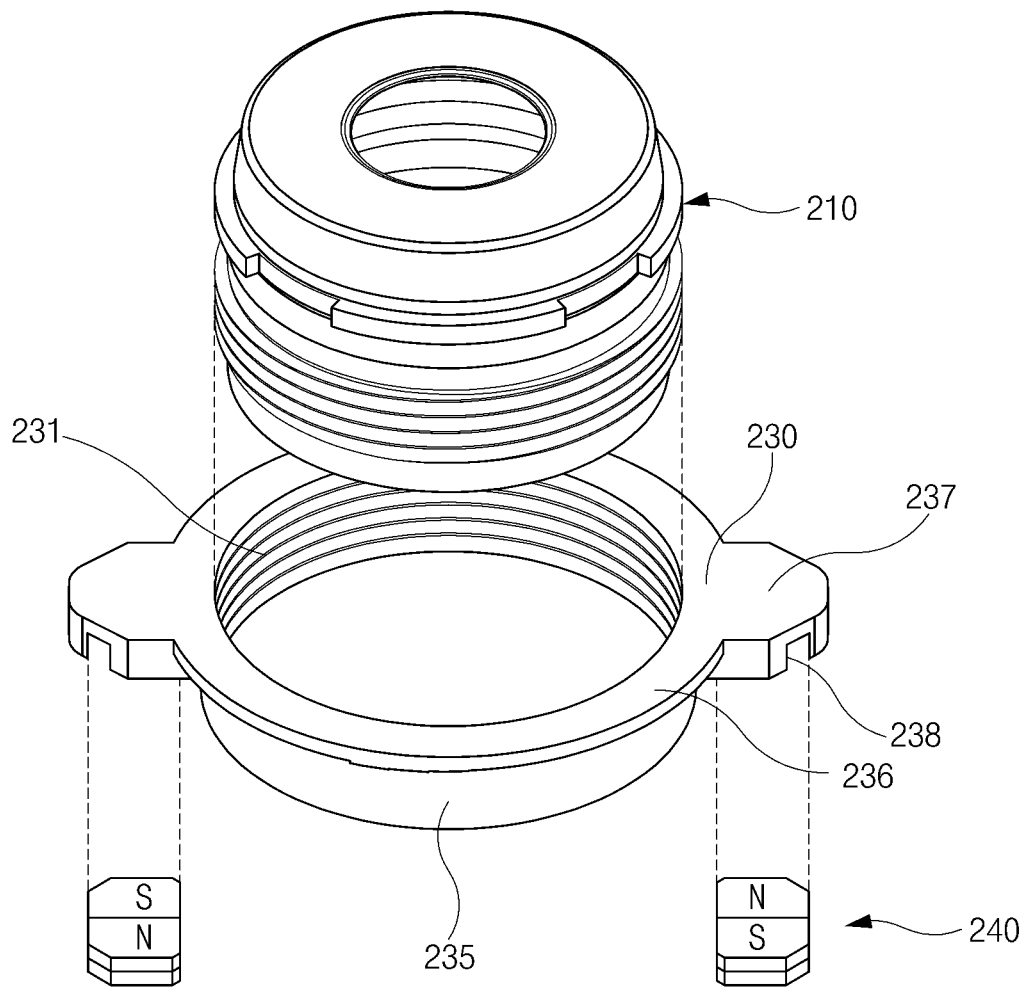
FIG. 2C is a detailed perspective view illustrating a second housing and a barrel, according to an embodiment of the present disclosure.

FIG. 2B is a sectional view of a camera device, according to an embodiment, and FIG. 2C is a detailed perspective view illustrating the barrel and the second housing, according to an embodiment. In connection with FIGS. 2A and 2B, the coupling of the coils 250, the second substrate 255, and the yokes 261 and the coupling of the barrel 210 and the second housing 260 will be described.

Referring to FIG. 2B, according to an embodiment, the coils 250, the second substrate 255, and the yokes 261 may be fixed to an inner bottom surface of the first housing 260.

According to an embodiment, the coils 250 may be mounted on the second substrate 255 and may be supplied with power from the power pad 268 (shown in FIG. 2A). When the power is applied to the coils 250, electromagnetic force may be generated between the magnets 240 and the coils 250. For example, the power pad 268 may be on a side surface of the second substrate 255. The second substrate 255 may be an FPCB to ensure flexibility and compactness.

According to an embodiment, the coils 250 may be located on the yokes 261 of the first housing 260 when the coils 250 are mounted on the second substrate 255. The coils 250 are fixed to the second substrate 255 by a fixing member (e.g., an adhesive). Lead lines of the coils 250 may be electrically connected (soldered) with the first substrate 295. A plurality of coils 250 and a plurality of magnets 240 may be provided so that the rotational force to the second housing 230 is more stable.

According to an embodiment, the yokes 261 may be provided for the coils 250. The yokes 261 may magnetic and may be located under the coils 250 to provide attractive forces to the magnets 240, which are disposed in parallel to the coils 250.

As illustrated in FIG. 2C, in the second housing 230 according to an embodiment, the magnets 240 may be fixed onto the bottom surface of the second housing 230. As the second housing 230 rotates clockwise or counterclockwise when the electromagnetic force is generated between the coils 250 and the magnets 240, the barrel 210 may move back and forth along the optical axis. According to an embodiment, if the second housing 230 is a rotary type housing, the amount of protrusion of the lens barrel may be reduced.

According to an embodiment, the second housing 230 may include a body 235, a guide part 236, and a plurality of wing parts 237. The body 235 may form an open cylinder to receive the barrel 210. The guide part 236 may be a lip extending outward from the upper surface of the body 235. For example, the guide part 236 may have an opening that coincides with the open cylinder of the body 235. The wing parts 237 may be in the shape of wings extending outward from the guide part 236. Hereinafter, elements of the second housing 230 working in conjunction with the barrel 210 will be described.

According to an embodiment, the barrel 210 may be fitted into the opening of the body 235 and fixed to the body 235. For example, a second groove (e.g. thread) 231 may be provided in the inner surface of the opening of the body 235 and may be engaged with a first groove 211 provided in the outer surface of the barrel 210. As the second groove 231 is engaged with the first groove 211, the barrel 210 may be seated in the opening in the body 235. Referring to FIG. 2B, the first groove 211 and the second groove 231 may be spiral threads. The barrel 210 is rotated in the body 235 using the first groove 211 and the second groove 231, fitted into the body 235, and thus coupled to the body 235.

According to an embodiment, the guide part 236 is a lip extends outward from the upper surface of the body 235. When mounted with the first housing 260, the bottom surface of the guide part 236 may be in contact with the ball bearings 263. Thus, if the second housing 230 is rotated by the electromagnetic force between the coils 250 and the magnets 240, the position of the bottom surface of the guide part 236 changes with respect to the ball bearings 263. The bottom surface of the guide part 236 may include steps or slope surfaces. According to an embodiment, the steps or slopes at the bottom surface of the guide part 236 may cause the barrel 210 to move along the optical axis when the second housing 230 is rotated. The details thereof will be described below with reference to FIGS. 4A and 4B.

According to an embodiment, the wing parts 237 may be provided in the shape of wings and be disposed symmetrically along the outer edge of the guide part 236. Each of the plurality of fixing grooves 238 may be provided in the lower portion of each wing part 237, such that the magnets 240 are fixed to the fixing grooves 238. The fixing grooves 238 may be substituted with other members (e.g., protrusions) capable of fixing the magnets 240. According to an embodiment, each of the magnets 240 may have an N polarity at one end and an S polarity at the opposite end thereof. Before the second housing 230 is subject to the electromagnetic force, the magnets 240 may be fixed into the fixing grooves 238 in such a manner that the magnets 240 are arranged in parallel to the coils 250. According to an embodiment, the magnets 240 may have various shapes. For example, the magnets 240 may have a polygonal shape (e.g., a rectangular shape) that is advantageous for coupling to the second housing 230.

In the above-described embodiment, the coils 250, the yokes 261, and the magnets 240 are provided in the plural for illustrative purposes. However, in alternative embodiments, one coil 250, one yoke 261 and one magnet 240 may be provided. Meanwhile, when the coils 250, the yokes 261, and the magnets 240 are provided in the plural, the same number of coils 250, yokes 261, and magnets 240 may be provided.

According to an embodiment, the heights of support members (e.g., reference numerals 230, 240, 250, 262, 263, 264, 265, and 267) which support the rotation of the barrel 210 may be minimized in order to maintain the compactness of the camera device. According to an embodiment, rotational force may be applied to the second housing 230 in a plurality of lateral directions. Accordingly, when the second housing 230 rotates clockwise or counterclockwise, the possibility of misalignment by the second housing 230 and the barrel 210 may be reduced.

According to an embodiment, the lens is fixed in a fixed focus (FF) manner but is not fixed along the optical axis. This way, focus may be adjusted by moving the lens along the optical axis.

Figure 3A:
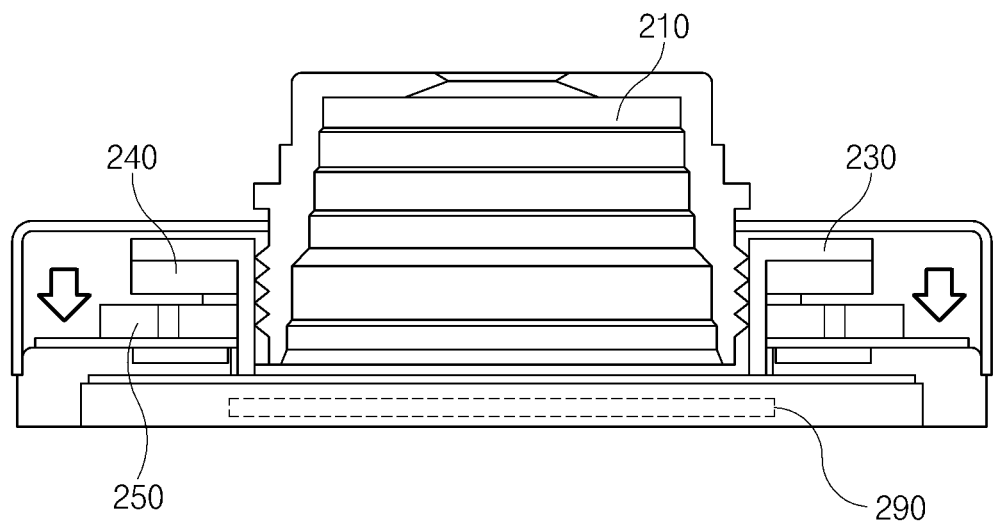
FIG. 3A is a sectional view illustrating the camera device before rotation is performed, according to an embodiment.
Figure 3B:
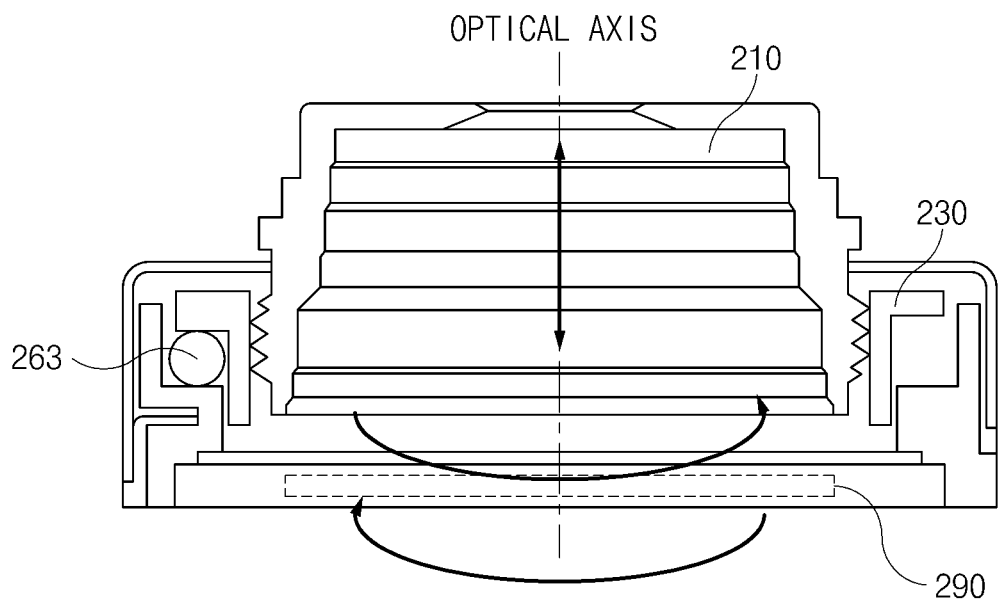
FIG. 3B is a sectional view of the camera device which is rotated, according to an embodiment.

FIG. 3A is a sectional view of the camera device before rotation is performed, according to an embodiment. FIG. 3B is a sectional view of the camera device which is rotated, according to an embodiment. Hereinafter, a method of driving the camera device according to an embodiment will be described with reference to FIGS. 3A and 3B.

As illustrated through an arrow of FIG. 3A, the yokes 261 may apply attractive forces to the magnets 240. The attractive forces may be applied by the yokes 261 regardless of whether power is supplied to the coils 250.

Referring to FIG. 3A, according to an embodiment, if power is not applied to the coils 250, the electromagnetic force is not generated between the magnets 240 and the coils 250. Thus, the image sensor 290 and the barrel 210 may be at positions where they are closest to each other.

Referring to FIG. 3B, according to an embodiment, if power is applied to the coils 250, the electromagnetic force generated between the coils 250 and the magnets 240 drives the second housing 230 to rotate clockwise or counterclockwise. The rotation direction of the second housing 230 may be determined depending on the direction of the current applied thereto by Faraday's law or Lorentz's law.

The application of power to the coils 250 and the direction of the current applied to the coils 250 may be controlled by a processor (e.g., a processor 820 of FIG. 8) that controls auto-focusing. For example, the processor may apply a specific quantity of current to the coils 250 for focusing, so that the barrel moves by a specific distance. Further, the processor may adjust the direction of the current supplied to the coils 250 to adjust the rotation direction of the second housing 230. Alternatively, the processor may further control the quantity of the current applied to the coil 250 in addition to the application of the power to the coils 250 and the direction of the current. When the processor controls the quantity of the current, the intensity of the electromagnetic force applied to the second housing 230 may be adjusted.

According to an embodiment, since the direction of the electromagnetic force between the coils and the magnets are not perpendicular to the moving direction of the barrel, the second housing may more stably move and thus focal length of the camera device may be more stably adjusted.

Figure 4A:
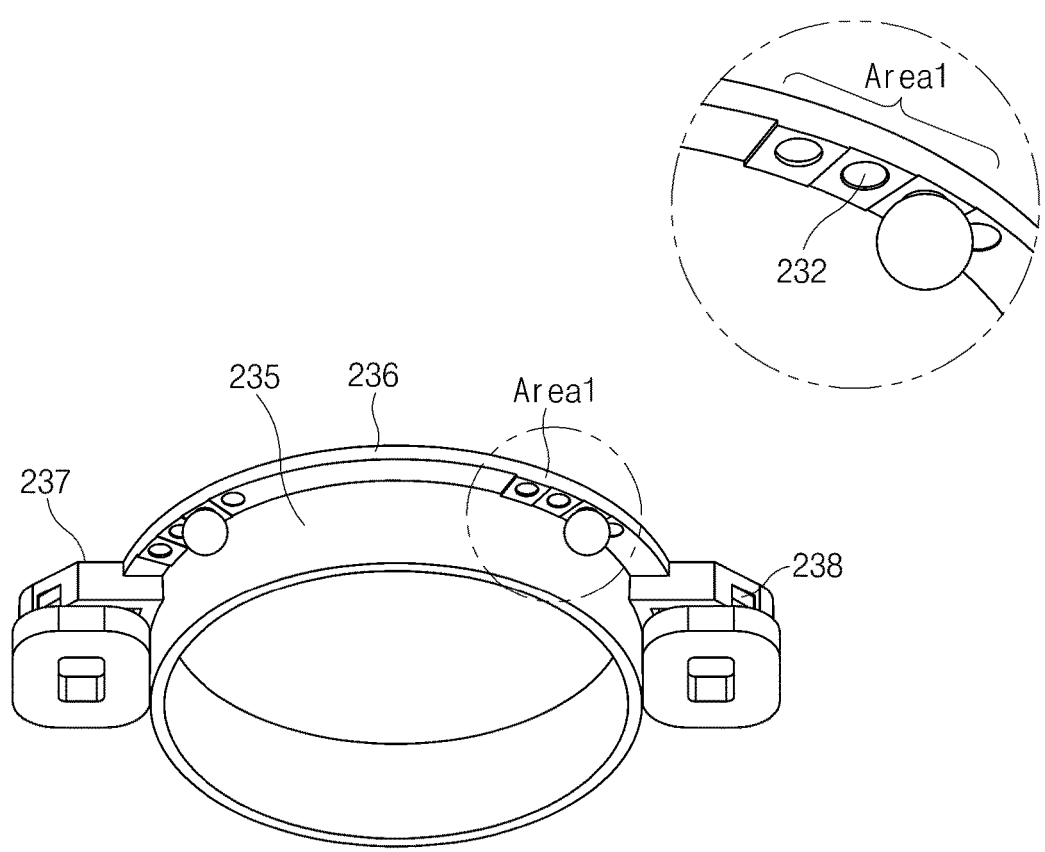
FIG. 4A and FIG. 4B are bottom views of the second housing, according to embodiments of the present disclosure.
Figure 4B:
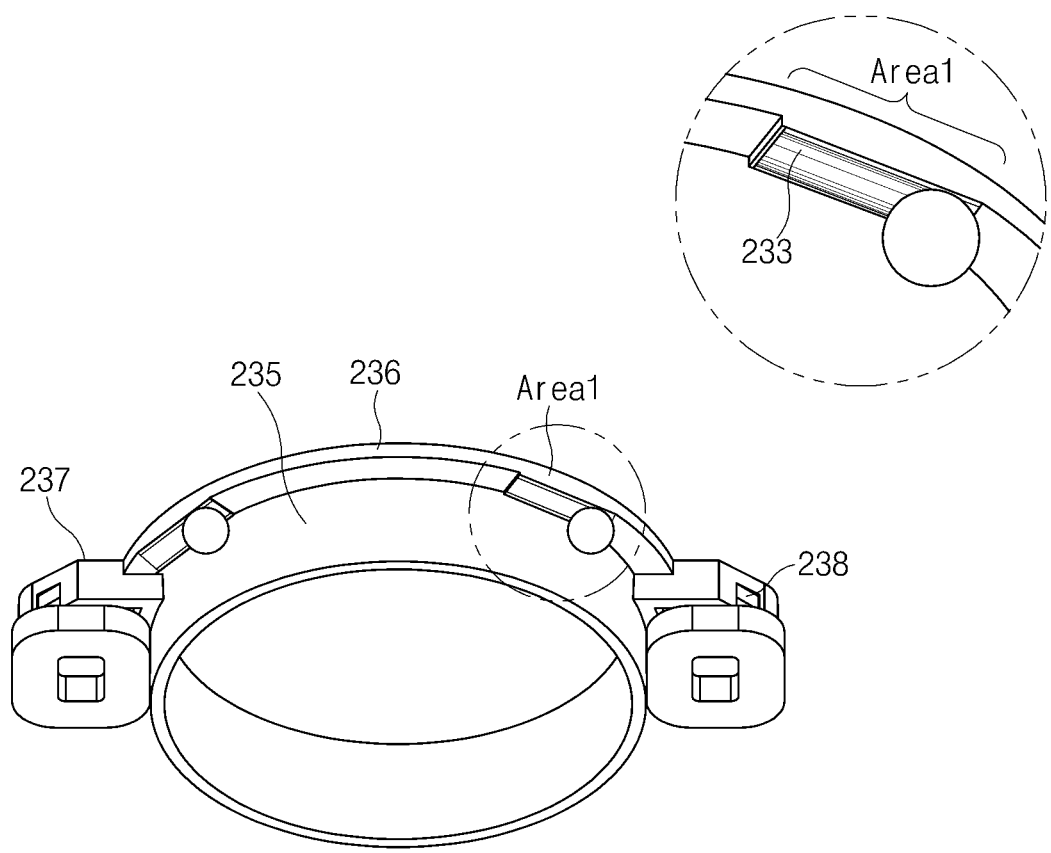

FIGS. 4A and 4B are views of the bottom surface of the second housing according to embodiments. As illustrated in FIGS. 4A and 4B, for the convenience of explanation, the first housing 260 is omitted and the ball bearings 263 are in contact with the bottom surface of the guide part 236 of the second housing 230.

According to an embodiment, the bottom surfaces of the guide part 236 may include one or more steps or linear slopes, such that the distance between the top and bottom surfaces of the guide part 236 varies. For example, the top surface of the guide part 236 may be flat. The distance between the top and bottom surfaces of the guide part 236 may decrease linearly or stepwise when the second housing 230 moves clockwise or counterclockwise. As the second housing 230 rotates, the height of the portion of the guide part 236 in contact with the ball bearings 263 may be varied. Accordingly, if the second housing 230 rotates, the rotation of the second housing 230 causes the barrel 210 to move back or forth along the optical axis. While moving along the optical axis, the barrel 210 may also rotate about the optical axis. In this case, the ball bearings 263 apply rolling friction force to the bottom surface of the guide part 236 to help the second housing 230 rotate.

As illustrated in FIG. 4A, a portion Area 1 of the bottom surface of the guide part 236 in contact with the ball bearings 263 may be in the shape of multiple steps having various heights. Accordingly, as the second housing 230 rotates, the height of the bottom surface of the guide part 236 in contact with the ball bearings 263 may be varied. Therefore, if the second housing 230 rotates, the barrel 210 may be moved along the optical axis according to rotation directions of the second housing 230.

For example, the steps of the bottom surface of the guide part 236 may include three steps having different heights such that three-stage focuses such as far, medium, and close focuses may be implemented. The height difference between the steps may be, for example, about 10 μm. However, the present disclosure is not limited to these number of steps and the height difference.

According to an embodiment, a seating groove 232 may be provided in a central portion of each step such that each ball bearing 263 is seated in the seating groove 232. The seating groove 232 may be provided in each step. Accordingly, the ball bearings 263 may be temporarily seated in the seating grooves 232 as the second housing 230 rotates. According to an embodiment, the degree of the rotation of the second housing 230 (or height of the second housing 230) may be constantly controlled by the seating groove 232. Accordingly, the processor (not shown) may not control the quantity of the current applied to the coils 250 such that the height of the barrel 210 moved up by the second housing 230 is adjusted.

According to an embodiment, the processor (not shown in FIG. 4A), which applies a specific quantity of the current to the coil for focusing, may adjust the rotation direction of the second housing 230 by adjusting the direction of the applied current. The processor may stop applying the current to the coils 250 after focusing. In this case, the ball bearings 263 may be seated in the seating groove 232 when the current is stopped. In addition, the second housing 230 may be more securely fixed due to the attractive force generated by the yoke 261.

As illustrated in FIG. 4B, according to an embodiment, the height of the portion Area 1 of the bottom surface of the guide part 236 in contact with the ball bearings 263 may be linearly sloped. The seating groove 233 may be provided in an elongated shape in the portion Area 1. The seating groove 233 extends along a path where the ball bearings 263 moves. The height of the central portion of the seating groove 233 may be linearly reduced, for example, as the second housing 230 moves clockwise. In other words, as the second housing 230 moves clockwise, the distance between the second housing 230 and the first housing 260 may decrease. In this case, the processor (not shown) may adjust the quantity of the current applied to the coil 250 to adjust the intensity of the electromagnetic force which rotates the second housing 230. As the processor adjusts the quantity of the current applied to the coil 250, the processor may control the height that the housing 230, which causes the barrel 210 to move along the optical axis. For example, as the processor applies current having first to Nth intensities (n≥2), the processor may adjust the intensity of the electromagnetic force. Accordingly, the degree of rotation of the second housing 230 may be varied depending on the intensity of the current flowing through the coil 250. In addition, as the processor varies the direction of the current applied to the coil 250, the processor may control the direction of the rotation of the second housing 230. In one embodiment, when the processor cuts off power applied to the coil 250, the second housing 230 may return to its initial position due to the attractive force generated by the yoke 261.

According to an embodiment, due to a height variation structures (e.g., reference numerals 232 and 233) of the second housing 230, the focal length of the lens group seated in the second housing 230 may be controlled when the second housing 230 rotates.

Figure 5A:
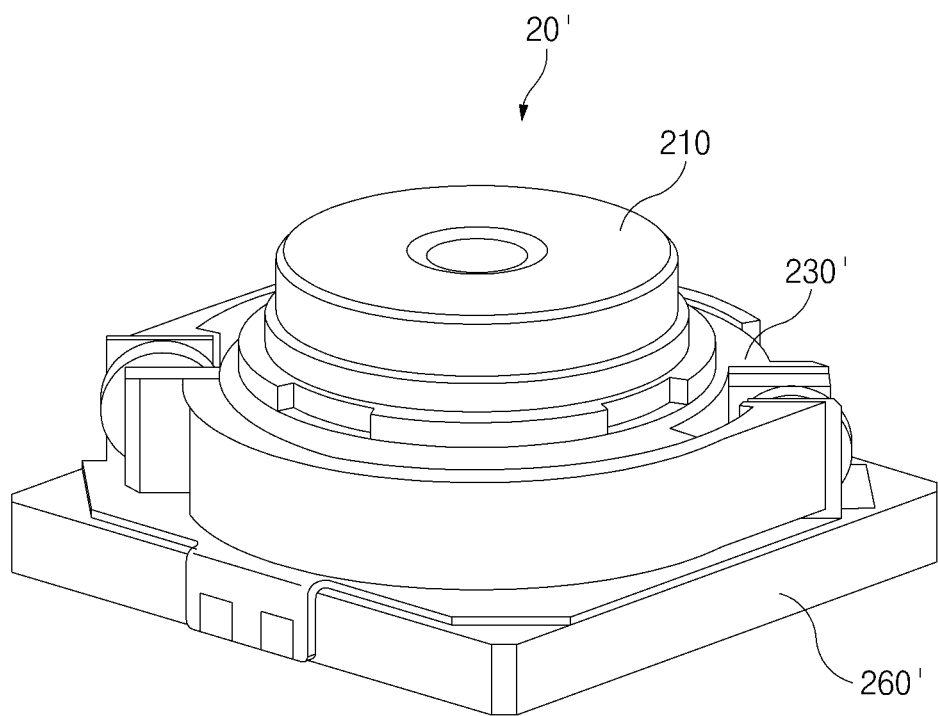
FIG. 5A, FIG. 5B and FIG. 5C are side perspective views of a camera device, according to another embodiment.
Figure 5B:
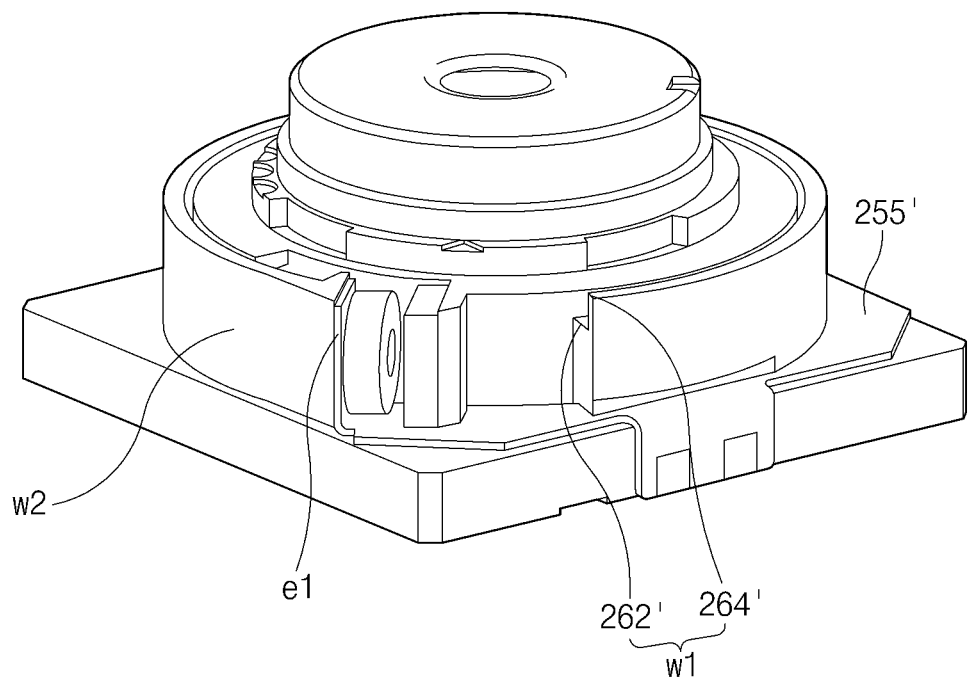
Figure 5C:
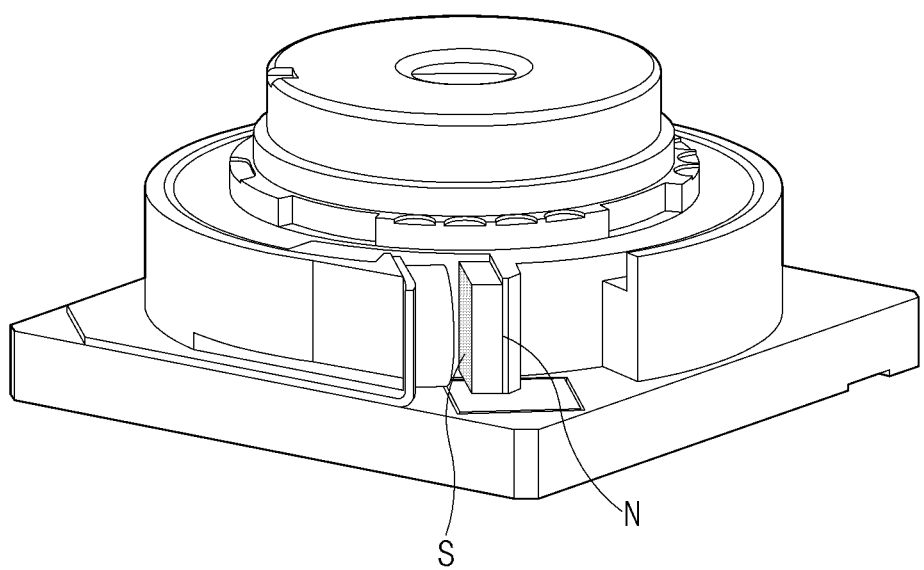
Figure 5D:
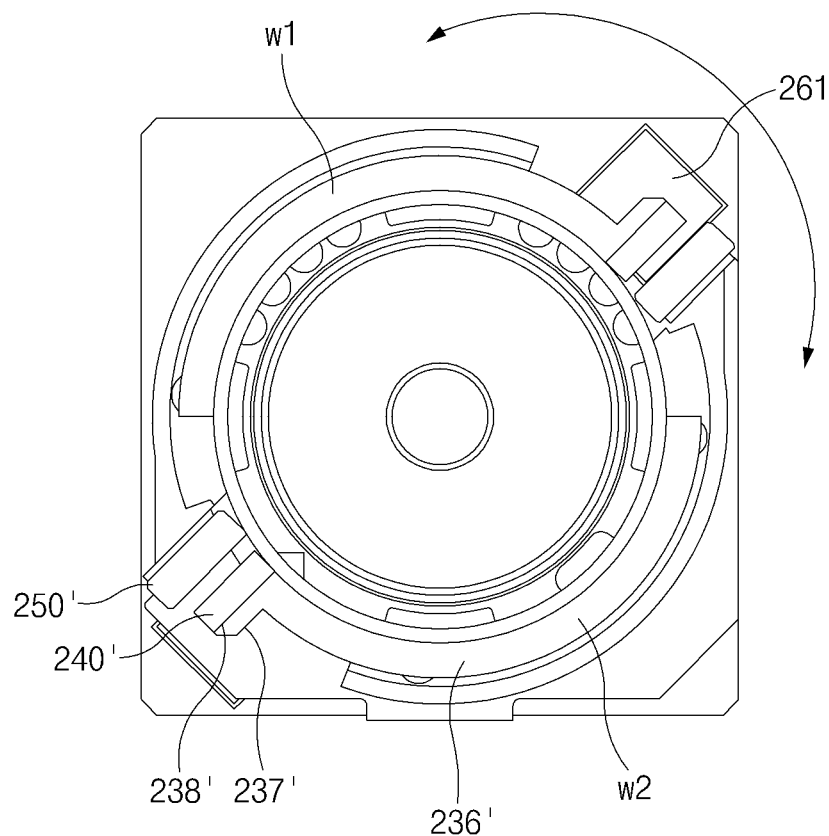
FIG. 5D is a top view of the camera device, according to another embodiment.
Figure 5E:
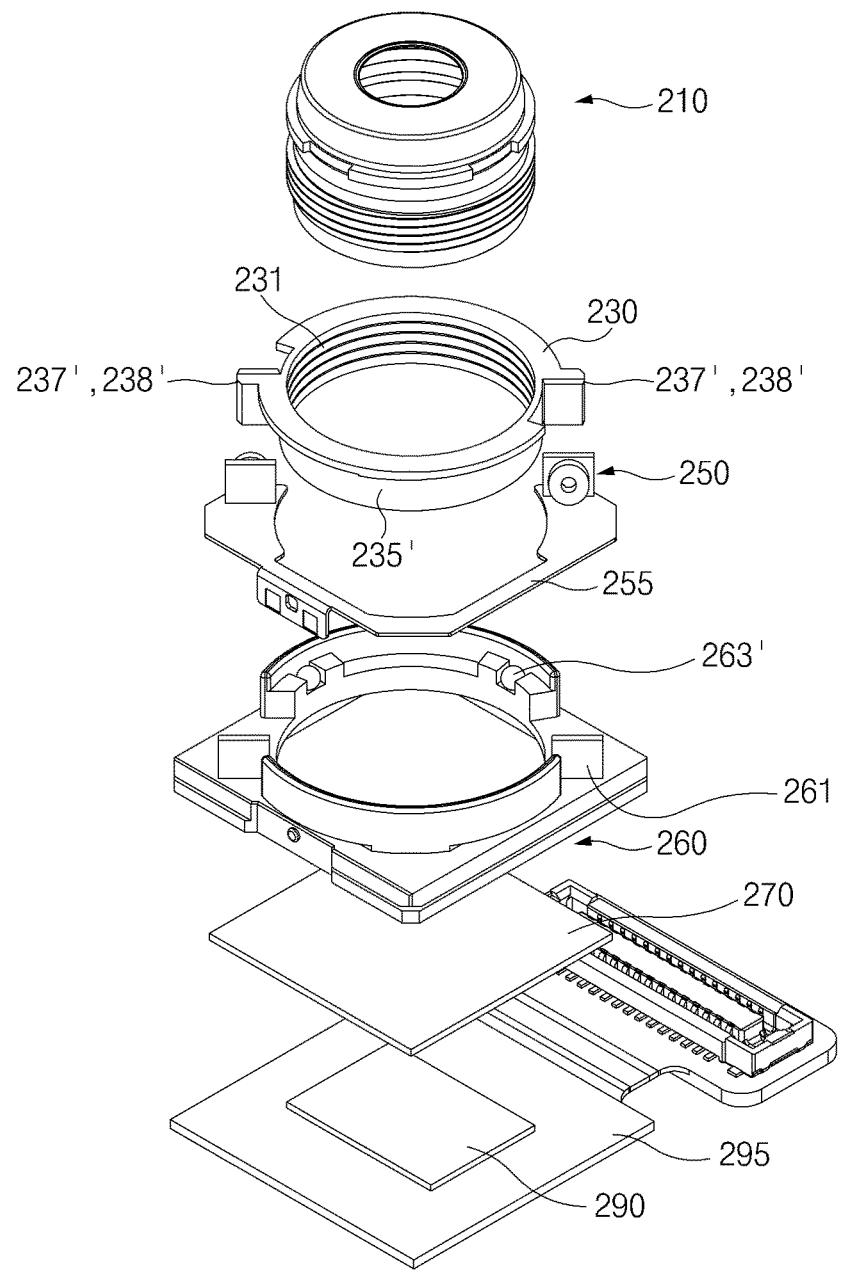
FIG. 5E is an exploded perspective view illustrating the camera device, according to another embodiment.

FIGS. 5A to 5C are side perspective views of a camera device, according to another embodiment. FIG. 5D is a top view of the camera device, according to another embodiment. FIG. 5E is an exploded perspective view of the camera device, according to another embodiment.

As illustrated in FIGS. 5A to 5E, according to another embodiment, the camera device 20' differs from the camera device 20 of the above described first embodiment mainly in terms of the shapes of the second housing 230' and the first housing 260' and the mounting structure for the second substrate 255'. Accordingly, the following description will be made with reference to FIGS. 5A to 5E while focusing on those elements of the camera device 20'—the first housing 260', the coils 250', the second substrate 255', and the plurality of magnets 240'. Accordingly, reference numerals of the elements according to this other embodiment, which are different in structure and arrangement from elements of the camera device 20 according to the above described first embodiment, are additionally marked with ['] so that the elements can be distinguished from each other.

Referring to FIG. 5A-5E, according to the other embodiment, the first housing 260' may include a rectangular outer frame and a plurality of curved walls w1 and w2. The curved walls w1 and w2 may include a first wall w1 and a second wall w2, both of which are in a U shape. The first and second curved walls w1 and w2 may be spaced apart from each other by a predetermined distance, and may be arranged to constitute a circular shape when viewed from the top. The curved walls w1 and w2 may further include the inner wall 262' and outer wall 264'. The coil 250' may be disposed at one end e1 of the curved walls w2. The one end e1 of the curved walls w2 may be in the shape of a plane having a size corresponding to the size of the coil 250' such that the coil 250' is easily fixed to the one end e1.

According to the other embodiment, a mounting part of the second substrate 255' for a plurality of coils 250' may be bent upwards, i.e. in the direction of the optical axis (O) so that the coils 250' may be fixed to the one end e1 of the curved wall 262' and 264'. Accordingly, the coils 250' may be arranged perpendicularly to the top surface of the first housing 260'.

As shown in FIGS. 5D and 5E, the second housing 230' may include a body 235', a plurality of guide parts 236', and a plurality of wing parts 237'.

The body 235' may include an open cylinder centrally located thereof. The body 235' may fix the barrel 210 seated in the open cylinder.

At least a portion of the bottom surfaces of the plurality of guide parts 236' may be in contact with a plurality of ball bearings 263'. Since the body 235' and the plurality of guide parts 236' may have identical or similar functionalities as the body 235 and the guide part 236 of the second housing 230, the details thereof will be omitted.

A plurality of wing parts 237' may be areas protruding in a specific shape (e.g., a rectangular shape) from the side surface of the body 235'. For example, each wing part 237' may protrude outwardly of the body 235' to form a surface perpendicular to the side surface of the body 235'. The wing parts 237' may be disposed symmetrically about the center of the body 235'. A magnet fixing part 238' may be provided on one surface of each wing part 237' to fix each magnet 240' to the magnet fixing part 238'

The magnet fixing part 238' may fix the magnet 240' such that the magnet 240', as shown in FIG. 5C, is vertical, i.e. the attractive forces generated by the magnet 240' is perpendicular to the optical axis (O). The magnet fixing part 238' may be formed at one end of each guide part 236' and on one surface of each wing part 237'. For example, the magnet fixing part 238', which is a groove having the shape corresponding to that of the corresponding magnet 240', may fix the magnet 240' fitted into the groove. Alternatively, the magnet fixing part 238' may be an adhesive member (e.g., a double-sided tape) which fixes each magnet 240' to one surface of each wing part 237'.

According to the other embodiment, a plurality of magnets 240' fitted into magnet fixing parts 238' may have different polarities on the first surface connected with one end of the guide part 236' and the second surface opposite the first surface. In other words, the magnets 240' may have the N polarity at one surface and the S polarity at the opposite surface thereof. Each of the magnets 240' may be fixed to one surface of the corresponding guide part 236' while being parallel to the optical axis (0) and to the corresponding coil 250'.

Hereinafter, the driving of the second housing 230' will be described with reference to FIG. 5D, according to the other embodiment.

Referring to FIG. 5D, according to the other embodiment, the yokes 261 may provide attractive force to the magnets 240'. Accordingly, before power is applied to the coil 250', the second housing 230', to which the magnets 240' are fixed, may be in its initial position due to the attractive force generated by the yokes 261.

Meanwhile, if power is applied to the coil 250', as the electromagnetic force generated due to the current flowing through the coil 250' pushes or pulls the magnet 240', the second housing 230' may rotate clockwise or counterclockwise. In this case, the electromagnetic force may act clockwise or counterclockwise depending on the direction of the current flowing through the coil 250'.

If the current flowing through the coil 250' is cut off, each magnet 240' may be attracted by its corresponding yoke 261 such that the second housing 230' returns to its initial position.

According to the other embodiment, using the coil 250' as a solenoid, electromagnetic force, which is generated due to the current flowing through the coil, may push the second housing 230' to rotate.

Figure 6A:
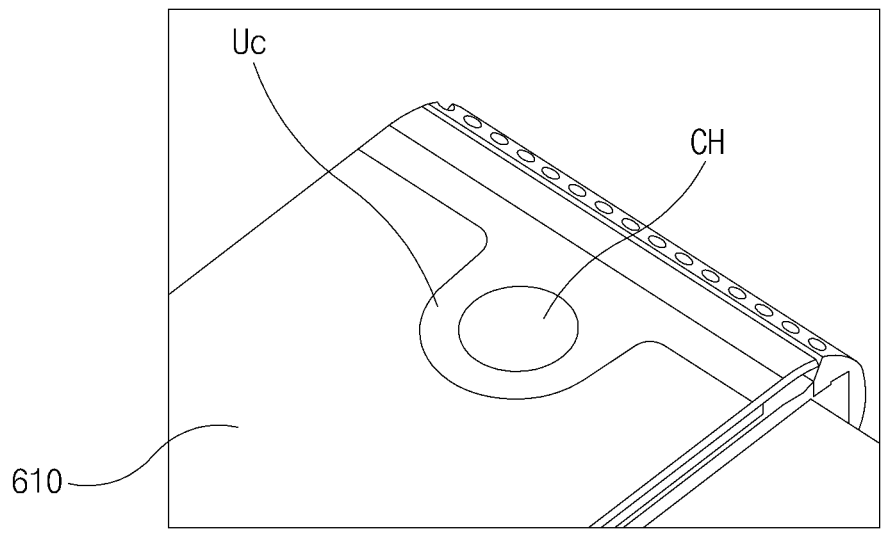
FIG. 6A is a view illustrating an outer appearance of a smartphone where the camera device is the front camera, according to an embodiment.
Figure 6B:
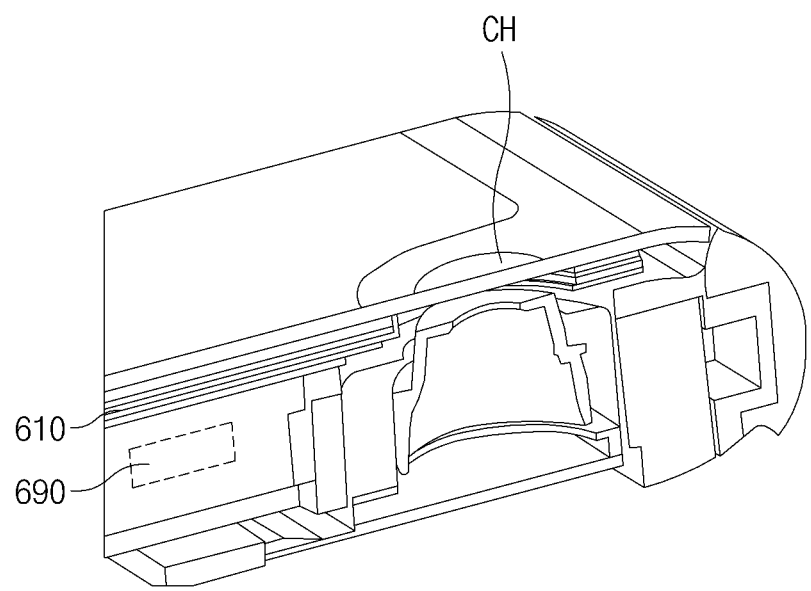
FIG. 6B is a sectional view of the smartphone where the camera device is the front camera, according to an embodiment.

FIG. 6A is a view illustrating an outer appearance of a smartphone where the camera device is the front camera, according to an embodiment. FIG. 6B is a sectional view of the smartphone where the camera device is the front camera. FIGS. 6C to 6F are sectional views of the smartphone.

The electronic device in FIGS. 6A-6F may include a processor 690, a display module 610, and the camera device 20. The electronic device may be, for example, a smartphone.

According to an embodiment, the processor 690 may include, for example, at least one of a central processing unit (CPU), a graphics processing unit (GPU), a microprocessor, an application processor (application), an application specific integrated circuits (ASICs), or a field programmable gate array (FPGA), or may have a plurality of cores. The processor 690 may perform, for example, data processing or an arithmetic operation associated with control and/or communication of at least one other element(s) of the smartphone. For example, the processor 690 may adjust the focus of an image sensor (e.g., the image sensor 290 of FIG. 1) by applying power to the coils 250. Alternatively, the processor 690 may display an image, which is captured through the image sensor, on the display module 610.

According to an embodiment, the display module 610 may include a cover glass 611, a touchscreen panel 612, the display panel 613, and a pressure sensor 614. The cover glass 611 may be transparent. The touchscreen panel 612 may detect the touch input of the user. The display panel 613 may be various displays such as liquid crystal displays (LCDs) or organic light emitting displays (OLEDs). Furthermore, the pressure sensor 614 may sense a pressure input of the user. At least some elements (e.g., the pressure sensor) of the display module 610 may be omitted.

According to an embodiment, the camera device 20 may include the image sensor 290 and various elements 260, 261, 250, 240, 230, and 210 for providing auto-focusing of the camera device. In the following description, since the camera device 20 has been described above, the details thereof will be omitted.

According to an embodiment, the camera device 20 may be disposed near the display module 610. It may be desirable to implement the smartphone such that the display panel 613 substantially constitutes the entirety of the front surface of the smartphone. In this case, the camera device 20 may be disposed in a cutaway area of the outer portion (bezel port) of the display module 610. An escape hole (e.g., U-cut (Uc) and a circle hole CH) may be formed in the display module 610. The U-cut (Uc) and the circle hole (CH) may be formed by cutting out from the display module 610, so that the camera device 20 can be seated within the escape hole. As the size of the camera device 20 is increased, the size of the escape hole Uc or CH must also increase. Similarly, as the width of the barrel 210 or the widths of the support members (e.g., 230, 240, 250, 262, 263, 264, 265, and 267) are increased, the size of the escape hole Uc or CH must also increase. Alternatively, if the support members (e.g., 230, 240, 250, 262, 263, 264, 265, and 267) are positioned at the periphery of the barrel 210, which is close to the cover glass 611, the size of the escape hole Uc or CH must also increase.

However, in the camera device 20 according to the above-described embodiments, since the support members (e.g., 230, 240, 250, 262, 263, 264, 265, and 267) are positioned primarily below the barrel 210, the size of the escape hole Uc or CH may be prevented from increasing. As described above, according to an embodiment, the size of the U-cut or the circle hole may be reduced, so that the display panel 613 can be implemented to cover substantially the entirety of the front surface of the smartphone. In addition, the camera device 20 also contributes to maintain the compactness of the smartphone.

According to an embodiment, the camera device 20 may be disposed under the cover glass 611 of the display module 610. The space between the third housing 220 and the display module 610 may be sealed with a set mechanism 620 and a dust/water-proof tape 630, i.e. the set mechanism 620 and the dust/water-proof cushion tape 630 may fill in the space between the third housing 220 and the display module 610. Therefore, according to an embodiment, the smartphone having the camera device 20 may prevents foreign matters from obstructing the image sensor 290 because foreign matters are prevented from sticking to the barrel 210.

Figure 6C:
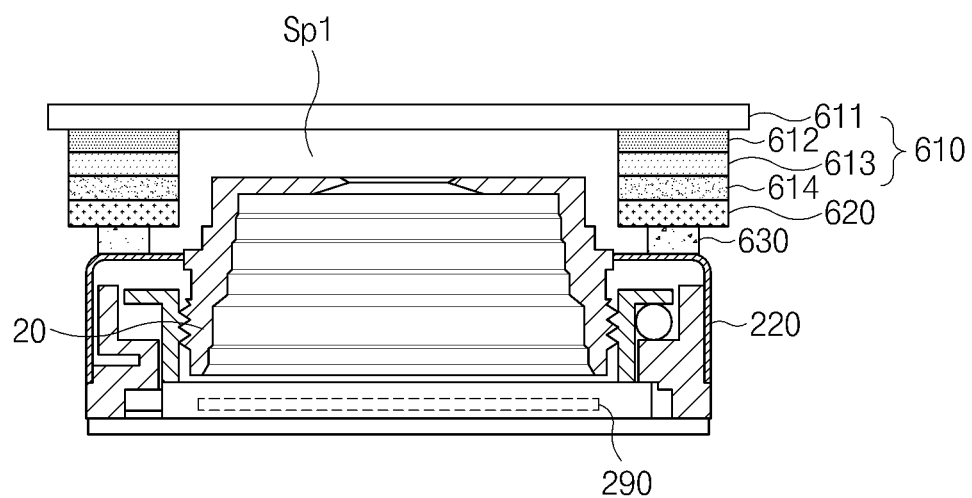
FIG. 6C, FIG. 6D, FIG. 6E and FIG. 6F are sectional views of the smartphone where the camera device is the front camera, according to an embodiment.

Referring to FIG. 6C, a moving space Sp1 may be provided between the top of the barrel 210 of the camera device 20 and the cover glass 611 and may have a shape corresponding to the shape of the barrel 210. The moving space Sp1 may provide a space that allows the barrel 210 to move along the optical axis when the focus is adjusted by the camera device 20. The moving space Sp1 may be provided by the escape hole Uc or CH.

Figure 6D:
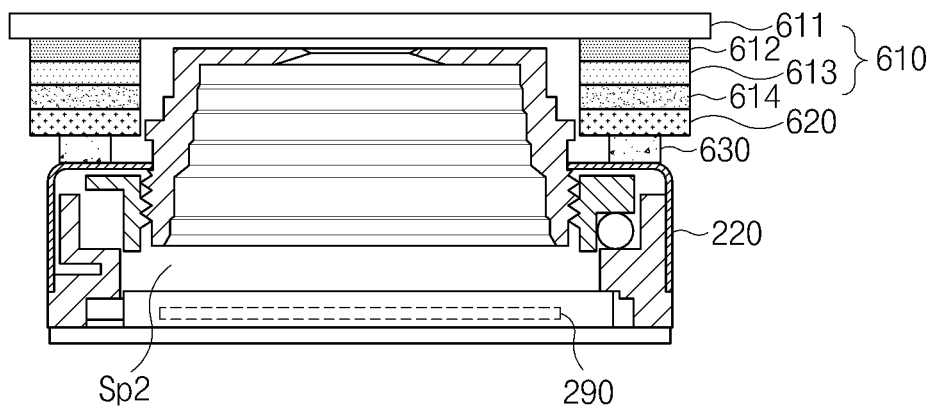

Referring to FIG. 6D, as the second housing 230 rotates, the barrel 210 may be at the maximum distance from the image sensor 290. In this case, the barrel 210 may be at a position closest to the cover glass 611. If the barrel 210 is spaced apart from the image sensor 290, a space Sp2 may be present between the barrel 210 and the image sensor 290. The space Sp2 corresponds to a reduction of the moving space Sp1.

Figure 6E:
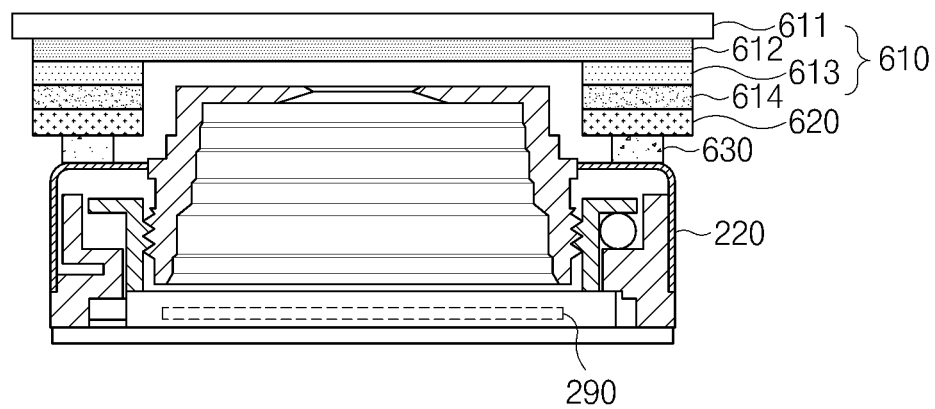
Figure 6F:
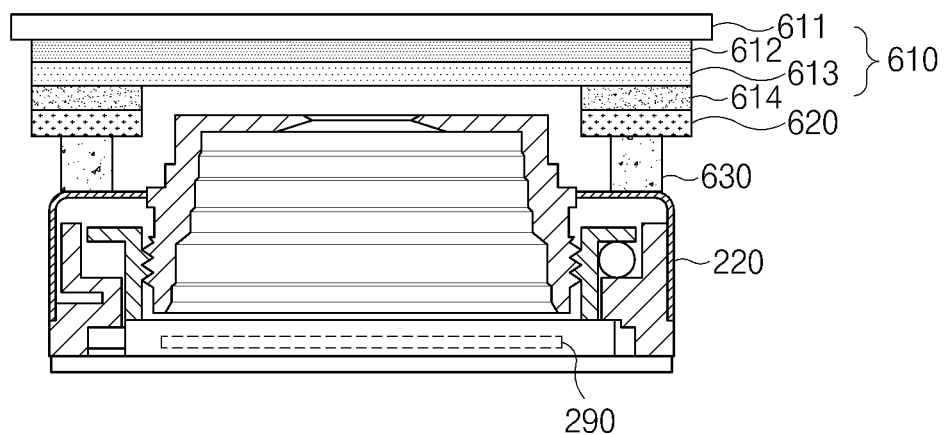

Referring to FIGS. 6E and 6F, according to an embodiment, the camera device 20 may be disposed at an area depending on the height of the smartphone. The area may be formed by opening a portion of the display module 610.

As illustrated in FIG. 6E, according to an embodiment, the camera device 20 may be disposed under the escape hole formed by opening the pressure sensor 614 and the display panel 613. In this case, the camera device 20 may move the barrel 210 along the optical axis in a space under the cover glass 611. The touch screen panel 612 may be transparent so as to allow the image sensor 290 to capture images.

As illustrated in FIG. 6F, the camera device 20 may be disposed under the escape hole formed by opening the pressure sensor 614 in the display module 610. In this case, the camera device 20 may move the barrel 210 along the optical axis in the space under the display panel 613. The area of the display module 610 positioned in the escape hole Uc or CH may be transparent so as to allow the image sensor 290 to capture images.

Figure 7:
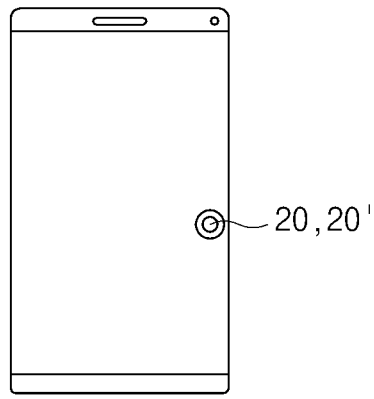
FIG. 7 is a view of a smartphone where the camera device is on the side surface of the smartphone, according to an embodiment.

FIG. 7 is a view of a smartphone where the camera device is on the side surface of the smartphone, according to an embodiment. As described in the above embodiments, the description has been made for when the camera device 20 or 20' is provided in a bezel part of the display module 610 or under the display module 610. However, as illustrated in FIG. 7, the camera device 20 or 20' may be provided in another portion of the smartphone.

As illustrated in FIG. 7, according to an embodiment, the camera device 20 may be on one side area of the front surface of the smartphone. Even in this case, each element of the camera device 20 may constructed according to the embodiments described above. Accordingly, the details of the elements of the camera device 20 will be omitted. According to another embodiment, the camera device 20 may be provided on the rear surface of the smartphone.

According to one or more embodiments, the camera device 20 may be applied to various positions depending on the shape of smartphone. The camera device 20 may be applied to various types of display panels.

By virtue of the camera device 20, the size of the circle hole or the U-cut in a display of an electronic device may be reduced. According to an embodiment, although the camera device 20 may be manufactured through a process substantially similar to that of a conventional FF structure since cushion tape may adhere to the lens group similarly to the conventional FF structure, the diameter size of the hole in the display may be reduced.

According to one or more embodiments, an electronic device (e.g., reference numeral 1101) comprises a housing (e.g., 1120) including a first surface facing a first direction and a second surface facing a second direction that is opposite to the first direction; a camera device disposed in a portion of the first surface to face the first direction; and a processor electrically connected with the camera device a camera device (e.g., reference numeral 20) may include a plurality of lenses arranged along a first axis extending in a first direction, a barrel encapsulating the plurality of lenses, an image sensor (e.g., reference numeral 290) interposed between the plurality of lenses and the second surface, and an actuator (e.g., reference numeral 240 or 250) configured to change the distance between the lens and the image sensor as the barrel moves along the first axis.

According one or more embodiments, the camera device (e.g., reference numeral 20) may further include circular support structures (e.g., reference numeral 262, 264, 263, 265, 267, 230, or the like) interposed between the image sensor (e.g., reference numeral 290) and the plurality of lenses and fixed to the barrel.

According to one or more embodiments described above, the actuator (e.g., reference numeral 240 or 250) may rotate the support structures (e.g., reference numeral 262, 264, 263, 265, 267, 230, or the like) about the first axis. The actuator (e.g., reference numeral 240 or 250) may include an electromagnet 250 and the support structures (e.g., reference numeral 262, 264, 263, 265, 267, 230, or the like) may include a magnetic substance (e.g., reference numeral 240) moved by the electromagnet 250. The electromagnet 250 may be disposed such that the magnetic substance (e.g., reference numeral 240) rotates about the first axis.

According to one or more embodiments described above, the portable electronic device (e.g., an electronic device 801) may further include a display (e.g., reference numeral 860) exposed through at least a portion of the first surface.

According to one or embodiments described above, the portable electronic device (e.g., an electronic device 801) may further include a memory (e.g., reference numeral 830) electrically connected with the processor (e.g., reference numeral 820). For example, the memory (e.g., 830) may store instructions that, when executed, causes a processor (e.g., reference numeral 820) to drive an actuator (e.g., reference numeral 240 or 250) to focus an image to be captured by an image processor.

According to the embodiment, the electronic device, which may automatically adjust focus of an image, includes a display module including a cover glass, a touch screen panel (TSP), and a display panel. The electronic device also includes a first housing that has at least one coil and applies rolling friction force by a plurality of ball bearings disposed in an outer portion of the first housing, and a second housing that includes at least one magnet facing the at least one coil. As the second housing rotates clockwise or counterclockwise by the resultant force of the electromagnetic force between the coil and the magnet, the second housing moves a barrel containing a lens group along an optical axis. The barrel is positioned at the same height as that of at least a portion of the display module except for the cover glass.

FIG. 8 illustrates an electronic device 801 in a network environment 800, according to one embodiment. According to one embodiment disclosed in the present disclosure, the electronic device 801 may include various types of devices. For example, the electronic device 801 may include at least one of a portable communication device (e.g., smartphones), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer, a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audios, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may complexly provide functions of multiple devices. In the present disclosure, the term "user" used herein may refer to a person who uses the electronic device or may refer to a device (e.g., an artificial intelligence electronic device) that uses the electronic device.

Referring to FIG. 8, under the network environment 800, the electronic device 801 (e.g., an electronic device) may communicate with an electronic device 802 through local wireless communication 898 or may communication with an electronic device 804 or a server 808 through a network 899. According an embodiment, the electronic device 801 may communicate with the electronic device 804 through the server 808.

According to an embodiment, the electronic device 801 may include a bus 810, a processors 820 (e.g., a processor) a memory 830, an input device 850 (e.g., a micro-phone or a mouse), a display 860, an audio module 870, a sensor module 876, an interface 877, a haptic module 879, a camera module 880, a power management module 888, a battery 889, a communication module 890, and a subscriber identification module 896. According to an embodiment, the electronic device 801 may not include at least one (e.g., the display 860 or the camera module 880) of the above-described elements or may further include other element(s).

For example, the bus 810 may interconnect the above-described elements 820 to 890 and may include a circuit for conveying signals (e.g., a control message or data) between the above-described elements. The processor 820 may include one or more of a central processing unit (CPU), an application processor (application), a graphic processing unit (GPU), a camera image signal processor (ISP) of a camera or a communication processor (CP). According to an embodiment, the processor 820 may be implemented with a system on chip (Soc) or a system in package (SiP). For example, the processor 820 may drive an operating system (OS) or an application to control at least one of another element (e.g., hardware or software element) connected to the processor 820 and may process and compute various data. The processor 820 may load an instruction or data, which is received from at least one of other elements (e.g., the communication module 890), into a nonvolatile memory 832 to process the instruction or data and may store the process result data into the nonvolatile memory 834. The processor 820 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. The functions and steps provided herein may be implemented in a combination of hardware and software and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 830 may include, for example, a volatile memory 832 or a volatile memory 832. The nonvolatile memory 832 may include, for example, a random access memory (RAM) (e.g., a dynamic random access memory (DRAM), a static RAM (SRAM), or a synchronous dynamic RAM (SDRAM)). The nonvolatile memory 834 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 834 may be configured in the form of an internal memory 836 or the form of an external memory 838 which is available through connection only if necessary, according to the connection forms of the electronic device 801. The external memory 838 may further include a flash drive such as compact flash (CF), secure digital (SD), micro secure digital (Micro-SD), mini secure digital (Mini-SD), extreme digital (xD), a multimedia card (MMC), or a memory stick. The external memory 838 may be operatively or physically connected with the electronic device 801 in a wired manner (e.g., a cable or a universal serial bus (USB)) or a wireless (e.g., Bluetooth) manner.

For example, the memory 830 may store, for example, at least one different software element, such as an instruction or data associated with the program 840, of the electronic device 801. The program 840 may include, for example, a kernel 841, a library 843, an application framework 845 or an application program (interchangeably, "application") 847.

The input device 850 may include a microphone, a mouse, or a keyboard. According to an embodiment, the keyboard may include a keyboard physically connected or a keyboard virtually displayed through the display 860.

The display 860 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's touch input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 801.

The audio module 870 may convert, for example, from a sound into an electrical signal or from an electrical signal into the sound. According to an embodiment, the audio module 870 may acquire sound through the input device 850 (e.g., a microphone) or may output sound through an output device (not illustrated) (e.g., a speaker or a receiver) included in the electronic device 801, an external electronic device (e.g., the electronic device 802 (e.g., a wireless speaker or a wireless headphone)) or an electronic device 806 (e.g., a wired speaker or a wired headphone) connected with the electronic device 801

The sensor module 876 may measure or detect, for example, an internal operating state (e.g., power or temperature) or an external environment state (e.g., an altitude, a humidity, or brightness) of the electronic device 801 to generate an electrical signal or a data value corresponding to the information of the measured state or the detected state. The sensor module 876 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor. The sensor module 876 may further include a control circuit for controlling at least one or more sensors included therein. According to an embodiment, the sensor module 876 may be controlled by using the processor 820 or a processor (e.g., a sensor hub) separate from the processor 820. In the case that the separate processor (e.g., a sensor hub) is used, while the processor 820 is a sleep state, the separate processor may operate without awakening the processor 820 to control at least a portion of the operation or the state of the sensor module 876.

According to an embodiment, the interface 877 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 878 may physically connect the electronic device 801 and the electronic device 806. According to an embodiment, the connector 878 may include, for example, an USB connector, an SD card/MMC connector, or an audio connector (e.g., a headphone connector).

The haptic module 879 may convert an electrical signal into mechanical stimulation (e.g., vibration or motion) or into electrical stimulation. For example, the haptic module 879 may apply tactile or kinesthetic stimulation to a user. The haptic module 879 may include, for example, a motor, a piezoelectric element, or an electric stimulator.

The camera module 880 may capture, for example, a still image and a moving picture. According to an embodiment, the camera module 880 may include at least one lens (e.g., a wide-angle lens and a telephoto lens, or a front lens and a rear lens), an image sensor, an image signal processor, or a flash (e.g., a light emitting diode or a xenon lamp).

The power management module 888, which is to manage the power of the electronic device 801, may constitute at least a portion of a power management integrated circuit (PMIC).

The battery 889 may include a primary cell, a secondary cell, or a fuel cell and may be recharged by an external power source to supply power at least one element of the electronic device 801.

The communication module 890 may establish a communication channel between the electronic device 801 and an external device (e.g., the first external electronic device 802, the second external electronic device 804, or the server 808). The communication module 890 may support wired communication or wireless communication through the established communication channel. According to an embodiment, the communication module 890 may include a wireless communication module 892 or a wired communication module 894. The communication module 890 may communicate with the external device (e.g., the first external electronic device 802, the second external electronic device 804 or the server 808) through a first network 898 (e.g. a wireless local area network such as Bluetooth or infrared data association (IrDA)) or a second network 899 (e.g., a wireless wide area network such as a cellular network) through a relevant module among the wireless communication module 892 or the wired communication module 894.

The wireless communication module 892 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the present disclosure, "GPS" and "GNSS" may be interchangeably used.

According to an embodiment, when the wireless communication module 892 supports cellar communication, the wireless communication module 892 may, for example, identify or authenticate the electronic device 801 within a communication network using the subscriber identification module (e.g., a SIM card) 896. According to an embodiment, the wireless communication module 892 may include the processor 820 (e.g., an application processor (AP) and a separate communication processor (CP). In this case, the communication processor may perform at least a portion of functions associated with at least one of elements 810 to 896 of the electronic device 801 in substitute for the processor 820 when the processor 820 is in an inactive (sleep) state, and together with the processor 820 when the processor 820 is in an active state. According to an embodiment, the wireless communication module 892 may include a plurality of communication modules, each supporting only a relevant communication scheme among cellular communication, short-range wireless communication, or a GNSS communication scheme.

The wired communication module 894 may include, for example, include a local area network (LAN) service, a power line communication, or a plain old telephone service (POTS).

For example, the first network 898 may employ, for example, WiFi direct or Bluetooth for transmitting or receiving instructions or data through wireless direct connection between the electronic device 801 and the first external electronic device 802. The second network 899 may include a telecommunication network (e.g., a computer network such as a LAN or a WAN, the Internet or a telephone network) for transmitting or receiving instructions or data between the electronic device 801 and the second electronic device 804.

According to embodiments, the instructions or the data may be transmitted or received between the electronic device 801 and the second external electronic device 804 through the server 808 connected with the second network. Each of the external first and second external electronic devices 802 and 804 may be a device of which the type is different from or the same as that of the electronic device 801. According to various embodiments, all or a part of operations that the electronic device (801 will perform may be executed by another or a plurality of electronic devices (e.g., the electronic devices 802 and 804 or the server 808. According to an embodiment, in the case that the electronic device 801 executes any function or service automatically or in response to a request, the electronic device 801 may not perform the function or the service internally, but may alternatively or additionally transmit requests for at least a part of a function associated with the electronic device 801 to another device (e.g., the electronic device 802 or 804 or the server 808). The another electronic device (e.g., the electronic device 802 or 804 or the server 808) may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used Hereinafter, the front surface of an electronic device 1101 will be described with reference to FIG. 9, according to one embodiment. The electronic device 1101 may include a display 1110 (the display panel 613 of FIG. 6C), a housing 1120, an optical sensor 1130, a receiver (e.g. speaker) hole 1140, a camera 1150 (e.g., the camera device 20) and a fingerprint sensor 1160. According to an embodiment, the display 1110 may be implemented as substantially the entire front surface of the electronic device 1101. Accordingly, the housing 1120 may constitute a minimal portion of the front surface of the electronic device 1101, or none of the front surface. The display 1110 may extend to, for example, the side surface of the electronic device 1101. According to another embodiment, the display 1110 may be positioned on a portion of the front surface of the electronic device 1101. In this case, the housing 1120 may constitute the remaining portion of the front surface of the electronic device 1101.

According to an embodiment, the optical sensor 1130, the receiver hole 1140, and the camera 1150 may be positioned, for example, at the upper end of the housing 1120 and the fingerprint sensor 1160 may be positioned at the lower end of the housing 1120 or the display 1110. In addition, the optical sensor 1130, the receiver hole 1140, the camera 1150, and the fingerprint sensor 1160 may be, for example, covered by the display 1110. The optical sensor 1130 may include, for example, a proximity sensor, an illuminance sensor, an iris sensor, or a UV sensor. According to an embodiment, the positions of the optical sensor 1130, the receiver hole 1140, the camera 1150, and the fingerprint sensor 1160 are not limited to the position illustrated in FIG. 9. For example, the optical sensor 1130 may be positioned at the lower end of the electronic device 1101.

Figure 10:
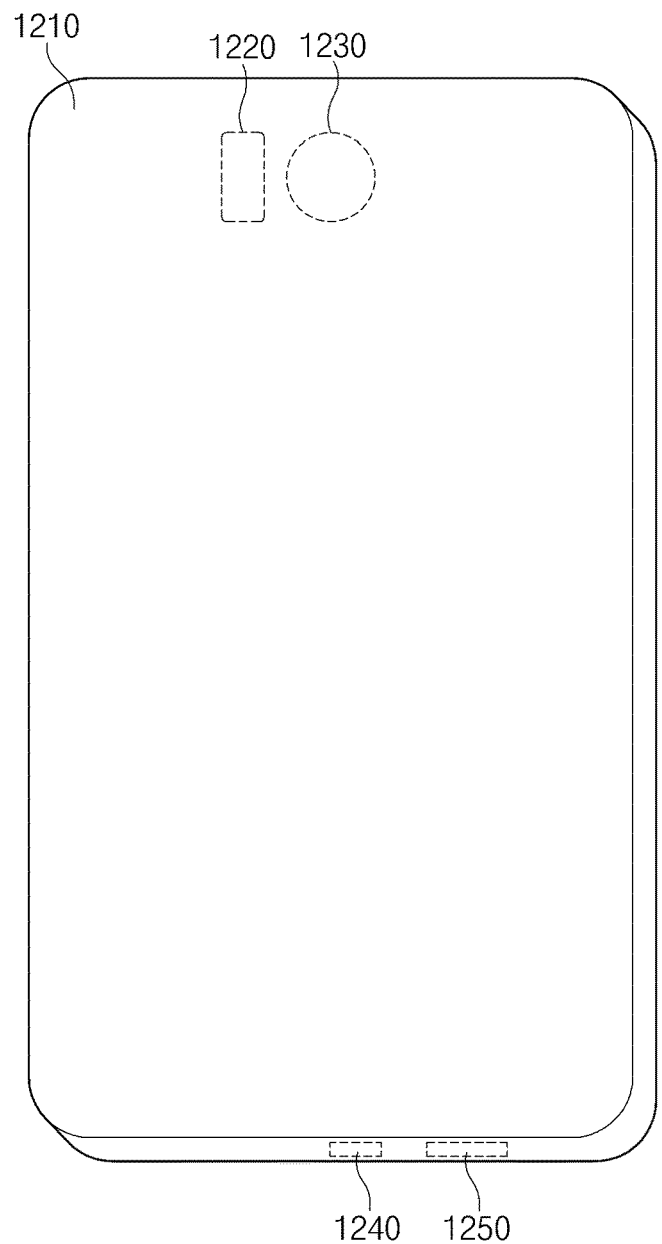
FIG. 10 is a view illustrating a rear surface and a side surface of the electronic device, according to one embodiment.

Hereinafter, the rear surface and the side surface of an electronic device 1201 will be described with reference to FIG. 10, according to one embodiment. The electronic device 1201 may include a housing 1210, a biometric sensor 1220, a camera 1230 (e.g., the camera device 20), an interface 1240, and a speaker 1250. According to an embodiment, the housing 1210 may constitute the rear surface and the side surfaces of the electronic device 1201. According to an embodiment, the biometric sensor 1220 and the camera 1230 may be positioned on the rear surface of the electronic device 1201. According to an embodiment, the biometric sensor 1240 and the speaker 1250 may be positioned on the side surface of the electronic device 1201. According to an embodiment, the positions of the biometric sensor 1220, the camera 1230, the interface 1240, and the speaker 1250 are not limited to the position illustrated in FIG. 10.

Figure 11:
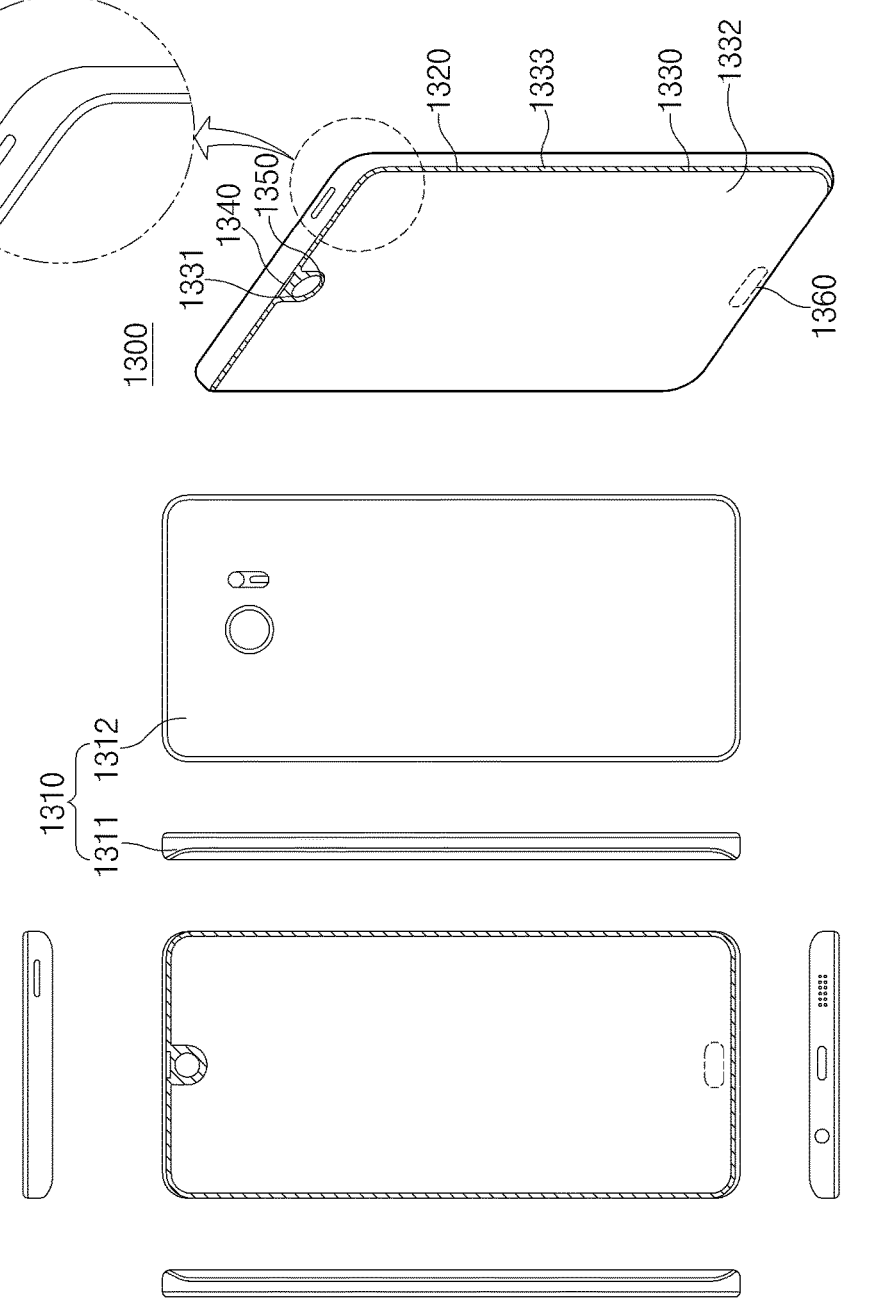
FIG. 11 illustrates a perspective view and six side views of the electronic device, according to an embodiment.

FIG. 11 illustrates a perspective view and six side views of an electronic device, according to an embodiment. Referring to FIG. 11, according to an embodiment, an electronic device 1300 may include a housing 1310, a cover glass 1320 (e.g. the cover glass 611 of FIG. 6C), a display panel 1330 (e.g. the display module 610 of FIG. 6C), a camera module 1340 (e.g. the camera device 20), a receiver or speaker hole 1350, and a home button 1360.

For example, the housing 1310 may include a first surface 1311 facing a first direction (front surface), a second surface 1312 facing a second direction (rear surface) opposite to the first direction, a side surface 1313 surrounding a space between the first surface 1311 and the second surface 1312.

The cover glass 1320 may protect elements such as the display panel 1330 of the electronic device 1300. The cover glass 1320 may correspond to at least the front surface of the electronic device 1300. For example, the cover glass 1320 may occupy the entirety or substantially the entirety of the front surface. In another embodiment, the cover glass 1320 may occupy a portion of the front surface and portions of the side surfaces. The cover glass 1320 may be substantially planar. Or in another embodiment, the cover glass 1320 may be curved such that the upper, lower, left, and/or right end of the cover glass 1320 is bent. The cover glass 1320 may be transparent. The cover glass 1320 may be made of a material such as tempered glass, plastic (e.g., PET), or aluminum oxide.

The display panel 1330 may be disposed under the cover glass 1320. If the cover glass 1320 is curved, the display panel 1330 may also be curved such that the left, right, upper and/or lower end of the display panel 1330 is bent.

The display panel 1330 may be a full front display to occupy substantially the entirety of the front surface of the electronic device. As the display panel 1330 is enlarged, the arrangement of other elements of the display panel 1330 may be changed. For example, elements such as the camera module 1340 and a receiver (not illustrated) may be provided at the outermost portion of the electronic device.

The display panel 1330 may include an active area 1332 and an inactive area 1333.

The active area 1332 may be exposed through the transparent area of the cover glass 1320. The active area 1332 may output light depending on electrical signals supplied through the scan lines and the data lines of the display panel 1330. The aspect ratio of the active area 1332 may be, for example, 19:9.

According to an embodiment, the active area 1332 may occupy at least a portion of the front surface and portion of the side surfaces. According to an embodiment, the active area 1332 may encapsulate the front surface. According to an embodiment, the active area 1332 of the electronic device

1300 may be closer to the side surface as compared with the active area of a typical electronic device. The side portion of the active area 1332 may perform functions such as a soft key for adjusting volume. The position of the soft key may be changed based on a grip state of the user or a user history of the soft key. The active area 1332 may occupy most portions of the front surface. For example, the active area 1332 may occupy about at least 90% of a whole area of the full surface.

The inactive area 1333 may be an area surrounding the active area 1332. According to an embodiment, the inactive area 1333 of the electronic device may be narrower than that of the typical electronic device. At least a portion of the inactive area 1333 may be exposed through the cover glass 1320. For example, the inactive area 1333, which serves as a peripheral area of the display panel 1330, may be covered by an opaque masking layer. The opaque masking layer may be formed by printing a layer on the cover glass 1320. The ration between widthwise and lengthwise thicknesses of the inactive area 1333 may be, for example, 1:1, 2:1, or 3:1. Alternatively, the ratio in thickness among an upper end, a side end, and a lower end of the active area 1333 may be, for example, 2:1:4.

The display panel 1330 may include at least one opening or at least one cutaway part. For example, the display panel 1330 may include at least one opening 1331 (e.g., the escape hole Uc or CH of FIG. 6A) formed in the upper end of the active area 1332. The display panel 1330 may be bent such that the opening 1331 is located at a corner of the display panel 1330. As illustrated in FIG. 11, when viewed from the front of the electronic device 1300, the opening 1331 may have a U-shaped space. Various modules of the electronic device 1300 may be exposed through the space formed by the opening 1331.

According to the present disclosure, a touch screen display may refer to a module including a touch screen, and/or a polarization plate in addition to a display panel 1330.

The camera module 1340 (e.g., the camera device 20 of FIG. 1) may be disposed at a position corresponding to the opening 1331. For example, the camera module 1340 may be disposed in a space formed by the opening 1331 or a similar cutaway portion. The camera module 1340 may be disposed in the space formed by the opening 1331 formed in the top end of the active area 1332. The camera module 1340 may be exposed through the cover glass 1320. For example, the camera module 1340 may be visible through the cover glass 1320 when the camera module 1340 is disposed under the cover glass 1320. The camera module 1340 may sense light incident thereto through the cover glass 120, so that it may acquire an image. According to an embodiment, the camera module 1340 may be disposed to be exposed through the center (i.e. middle) of the top end of the cover glass 820. According to an embodiment, the camera module 840 may be disposed towards the left or right side of the front surface.

The receiver hole 1350 may be used to transmit sound, which is generated from a receiver disposed in the housing 1310. The receiver hole 1350 may be formed in the side surface 1313 of the housing 1310. For example, the receiver hole 1350 may be formed in the metallic frame of the side surface 1313. When formed on the side surface, the sound transmitted by the receiver hole 1350 does not exert acoustic forces on the display panel 1330.

The front surface 1311 of the housing may have a specific curvature and may be formed integrally with the side surfaces, when the side surfaces constitute one metallic frame.

The home button 1360 may be disposed at the bottom end of the front surface of the electronic device 1300. The home button 1360 may be a physical key or a soft key. If the home button 1360 is the physical key, the display panel 1330 may include an opening or a cutaway portion formed at the bottom end of the active area 1332. The home button 1360 may be disposed in the space formed by the opening or the cutaway portion.

Alternatively, the home button 1360 may be implemented as a soft key at the lower end of the front surface of the electronic device 1300. If the home button 1360 is a soft key, a fingerprint sensor may be disposed under the area for the home button 1360 in the display panel 1330. The cover glass 1320 may include a recess part formed above the position where the fingerprint sensor is disposed.

As described above, according to an embodiment, the electronic device 1300 may include the display panel 1330, which is exposed through the front surface 1311 of the electronic device 1300, and the camera module 1340 positioned inside the display panel 1330.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device (e.g. 830).

The term "module" as used in the present disclosure may represent, for example, a unit including one or more combinations of hardware, software and firmware. The term "module" may be interchangeably used with the terms "unit", "logic", "logical block", "component" and "circuit". The "module" may be a standalone unit or part of an integrated component for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of the apparatus (e.g., modules or functions thereof) or the method (e.g., operations) according to embodiments of the present disclosure may be, for example, implemented by instructions stored in a computer-readable storage media in the form of a program module. The instruction, when executed by the processor 820, may cause the processor to perform a function corresponding to the instruction. The computer-readable storage media, for example, may be the memory 830.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

According to various embodiments, the height of the electronic device may be reduced because of the disclosed configurations of the camera device.

At least portions of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    an image sensor configured to capture an image;
    a barrel including a lens group arranged about a first axis perpendicular to the image sensor;
    a first housing fixed to the barrel;
    a second housing disposed under the first housing and coupled to the first housing;
    at least one magnetic substance disposed at one side of the first housing; and
    at first coil and a second coil disposed at opposite sides of the second housing, wherein when power is supplied to the first coil and second coil, electromagnetic force is generated between the first coil and second coil and the at least one magnetic substance, wherein the first coil and the second coil are separated,
    wherein, when the electromagnetic force is generated, the first housing rotates clockwise or counterclockwise, and the barrel moves along the first axis.

2. The electronic device of claim 1, further comprising:
    one or more of ball bearings provided at one or more portions of one or more curved walls of the second housing, wherein the one or more ball bearings are in contact with a bottom surface of the first housing and are adapted to apply a rolling friction force to the first housing when the first housing rotates.

3. The electronic device of claim 2, wherein the one or more ball bearings are arranged at intervals of 120° or 180° about a center of the first housing along the one or more curved walls.

4. The electronic device of claim 2, wherein the first housing further comprises:
    a body having a cylindrical opening to receive the barrel;
    a guide part extending outwardly from an upper surface of the body; and
    one or more wing parts extending outwardly from the guide part, each wing part having at least one fixing groove to receive the magnetic substance,
    wherein one or more portions of a bottom surface of the guide part are in contact with the ball bearings and receive the rolling friction force.

5. The electronic device of claim 4, wherein the one or more portions of the bottom surface of the guide part include a plurality of steps, each step having a seating groove in which a corresponding ball bearing is seated.

6. The electronic device of claim 4, wherein the one or more portions of the bottom surface of the guide part include slopes, such that a distance between the first housing and the second housing linearly increases or decreases depending on a rotation direction of the first housing.

7. The electronic device of claim 6, further comprising:
    a processor configured to adjust a distance between the image sensor and the barrel by adjusting a quantity of current applied to the at least one coil.

8. The electronic device of claim 4, wherein the at least one coil is fixed to a top surface of the second housing, and
    wherein the at least one magnetic substance includes one end having an N polarity and an opposite end having an S polarity, and is fixed to the bottom surface of the guide part to be parallel to the at least one coil.

9. The electronic device of claim 4, wherein the at least one coil is fixed to a top surface of the second housing and is perpendicular to the top surface of the second housing, and
    wherein the at least one magnetic substance includes one end having an N polarity and an opposite end having an S polarity, and is fixed to a side surface of the guide part to be parallel to the at least one coil.

10. The electronic device of claim 2, wherein the second housing includes an opening to receive the first housing, and wherein:
    the one or more curved walls are formed along a circumference of the opening, each curved wall includes an outer wall, an inner wall having a height lower than a height of the outer wall, and at least one rolling groove to receive a corresponding ball bearing, the outer walls prevent the first housing from moving in a direction perpendicular to the first axis, and the rolling grooves are formed by two protrusion parts formed on top surfaces of the inner walls.

11. The electronic device of claim 10, wherein the at least one coil is disposed in a gap between two curved walls.

12. The electronic device of claim 1, wherein at least one yoke is provided on an inner bottom surface of the second housing and under the at least one magnetic substance;

wherein the at least one yoke provides attractive force to the at least one magnet substance wherein the at least one magnetic substance includes a first magnetic substance disposed in parallel to the first coil, and second magnetic substance disposed in parallel to the second magnetic substance.

13. A portable electronic device comprising:

a housing including a first surface facing a first direction and a second surface facing a second direction that is opposite to the first direction;

a camera device disposed in a portion of the first surface to face the first direction; and a processor electrically connected with the camera device, wherein the camera device includes:

a plurality of lenses arranged along a first axis extending in the first direction;

a barrel encapsulating the plurality of lenses;

an image sensor interposed between the plurality of lenses and the second surface;

a circular support structure interposed between the image sensor and the plurality of lenses and fixed to the barrel, wherein the circular structure comprises a first protrusion having a first magnetic substance and a second protrusion having a second magnetic substance; and an actuator configured to change a distance between the lenses and the image sensor as the barrel is rotated around the first axis.

14. The portable electronic device of claim 13, further comprising:

a display exposed through at least a portion of the first surface.

15. The portable electronic device of claim 13, further comprising:

a memory electrically connected with the processor, wherein the memory stores instructions that when executed, cause the processor to drive the actuator to focus an image to be captured by an image sensor.

16. The portable electronic device of claim 13, wherein the actuator rotates the circular support structure about the first axis.

17. The portable electronic device of claim 13, wherein the actuator includes an electromagnet, configured to rotate the circular support structure by generating a force causing the first magnetic substance and the second magnetic substance to rotate.

18. The portable electronic device of claim 17, wherein the electromagnet rotates the magnetic substance about the first axis.

* * * * *